United States Patent
Son et al.

(10) Patent No.: US 9,733,719 B2
(45) Date of Patent: Aug. 15, 2017

(54) MOBILE TERMINAL AND METHOD OF CONTROLLING THE SAME

(71) Applicant: LG ELECTRONICS INC., Seoul (KR)

(72) Inventors: Hyuna Son, Seoul (KR); Jaeo Park, Seoul (KR); Jangik Lee, Seoul (KR); Yurim Kim, Seoul (KR); Woocheol Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 14/764,383

(22) PCT Filed: Aug. 22, 2014

(86) PCT No.: PCT/KR2014/007831
§ 371 (c)(1),
(2) Date: Jul. 29, 2015

(87) PCT Pub. No.: WO2015/199280
PCT Pub. Date: Dec. 30, 2015

(65) Prior Publication Data
US 2016/0266652 A1    Sep. 15, 2016

(30) Foreign Application Priority Data
Jun. 23, 2014  (KR) .................. 10-2014-0076696

(51) Int. Cl.
*G06F 3/16*    (2006.01)
*G06F 3/0485*  (2013.01)
(Continued)

(52) U.S. Cl.
CPC ............... *G06F 3/017* (2013.01); *G06F 3/01* (2013.01); *G06F 3/0416* (2013.01);
(Continued)

(58) Field of Classification Search
CPC .... G06F 3/017; G06F 3/0488; G06F 3/01883; G06F 1/1615–1/1626; G06F 1/162; G06F 1/1633
See application file for complete search history.

(56) References Cited

U.S. PATENT DOCUMENTS 8,255,836 B1 *   8/2012  Gildfind ............ G06F 3/04812
                                                    345/173
2006/0238517 A1 * 10/2006  King .................... G06F 1/1626
                                                    345/173
(Continued)

FOREIGN PATENT DOCUMENTS

KR   10-2013-0086713 A   8/2013
KR   10-2014-0070536 A   6/2014

*Primary Examiner* — Benjamin C Lee
*Assistant Examiner* — Dong Hui Liang
(74) *Attorney, Agent, or Firm* — Birch, Stewart, Kolasch & Birch, LLP

(57) ABSTRACT

Provided is a mobile terminal including: a main body; a display unit that is arranged to the main body and to which screen information is output; a sensing unit that senses a gesture that is applied to a region outside of the main body; and a controller that performs a function associated with at least one portion of the screen information that is output to the display unit if a predetermined-type gesture is applied to the region outside of the main body.

17 Claims, 30 Drawing Sheets

(a)

(b)

(51) Int. Cl.
    *G06F 3/041*     (2006.01)
    *G06F 3/01*     (2006.01)
    *G06F 3/0484*     (2013.01)
    *G06F 3/0488*     (2013.01)
    *H04B 1/40*     (2015.01)

(52) U.S. Cl.
    CPC ........ *G06F 3/0485* (2013.01); *G06F 3/04845* (2013.01); *G06F 3/04883* (2013.01); *G06F 3/165* (2013.01); *G06F 2203/04108* (2013.01); *H04B 1/40* (2013.01)

(56) References Cited

U.S. PATENT DOCUMENTS

| | | |
|---|---|---|
| 2008/0100572 A1 | 5/2008 | Boillot |
| 2009/0139778 A1* | 6/2009 | Butler .................. G06F 1/1626 178/18.03 |
| 2012/0068941 A1 | 3/2012 | Arrasvuori et al. |
| 2012/0154331 A1 | 6/2012 | Hasui |
| 2013/0082978 A1* | 4/2013 | Horvitz .................. G06F 3/017 345/175 |
| 2013/0293454 A1 | 11/2013 | Jeon et al. |
| 2014/0002339 A1 | 1/2014 | Guard |
| 2014/0055395 A1* | 2/2014 | Kim ...................... G06F 3/0485 345/173 |
| 2014/0104160 A1 | 4/2014 | Eriksson et al. |
| 2014/0267084 A1* | 9/2014 | Krulce .................. G06F 3/0416 345/173 |
| 2015/0227166 A1* | 8/2015 | Lee ........................ G06F 1/169 345/173 |
| 2015/0277539 A1* | 10/2015 | Chueh .................. G06F 1/3262 345/178 |

* cited by examiner (a)   (b)

(c)

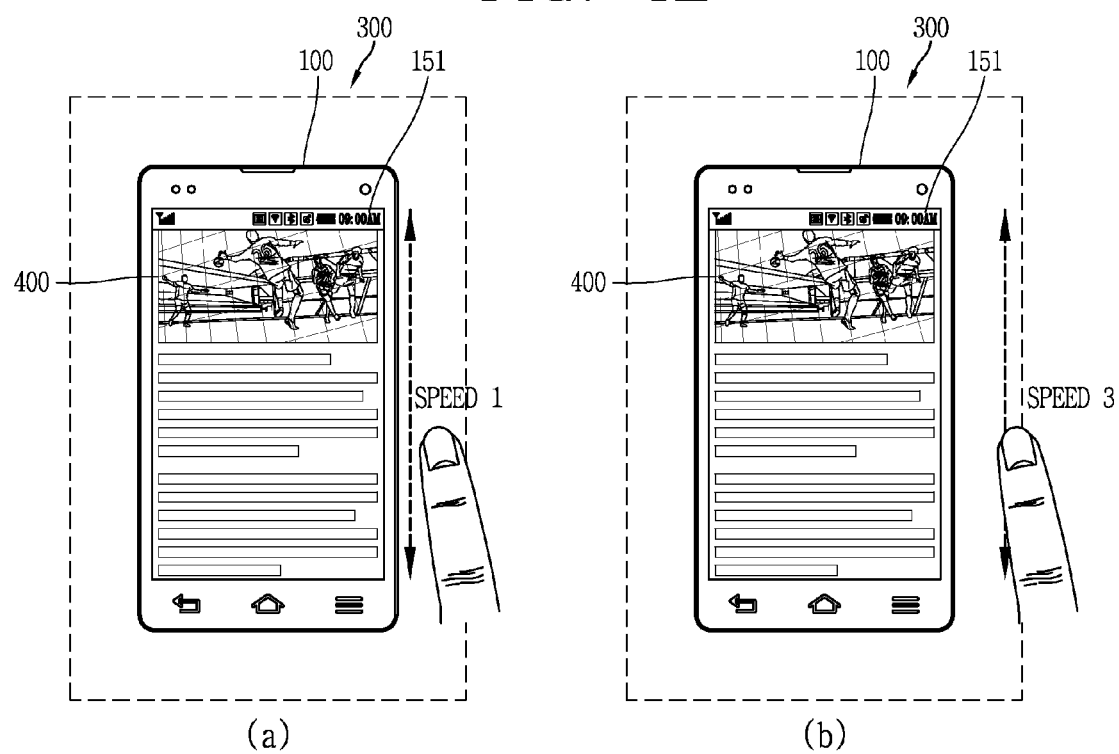

(a)                      (b)

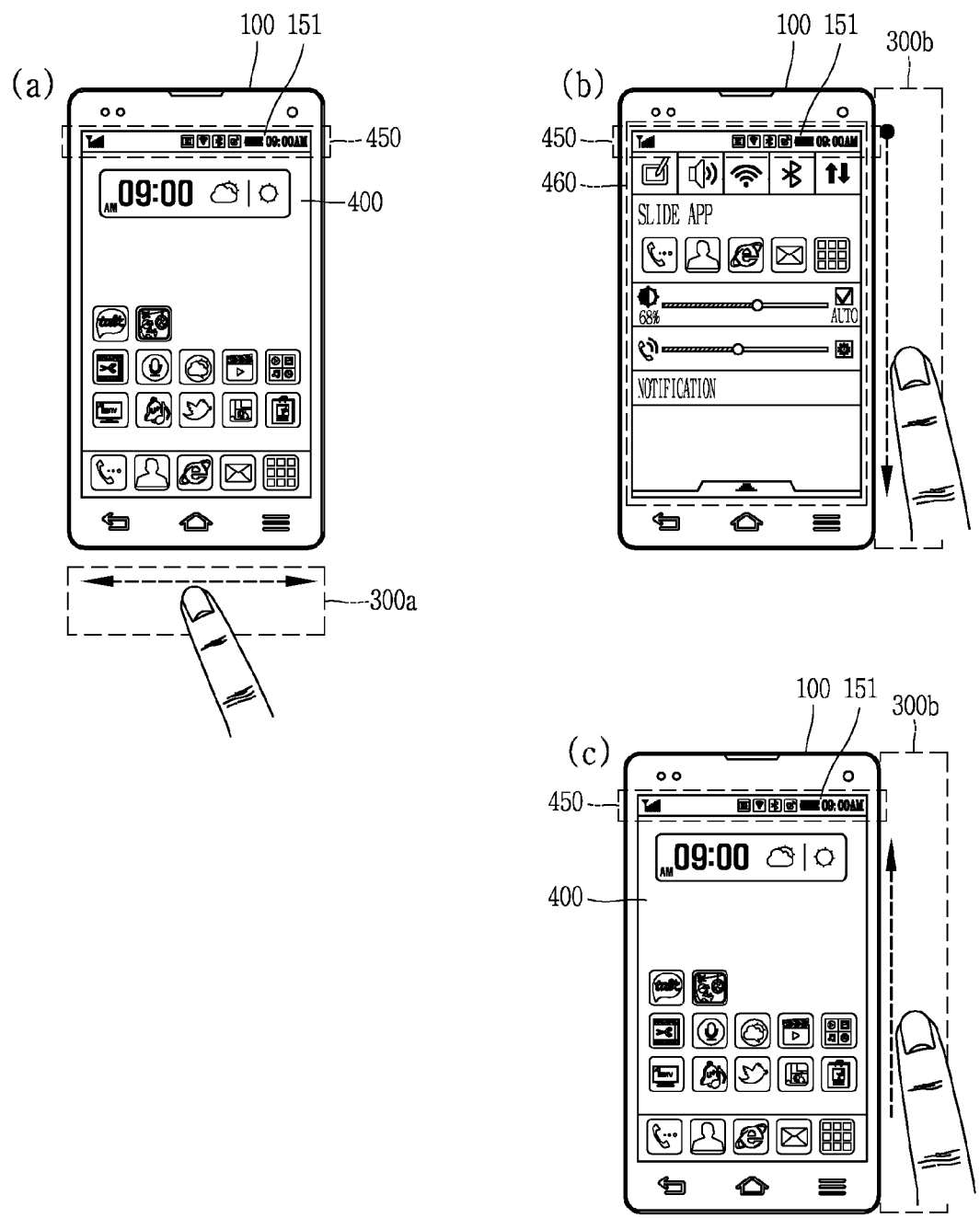

(a)

(b)

(a)

(b)

(a)

(b)

MOBILE TERMINAL AND METHOD OF CONTROLLING THE SAME

TECHNICAL FIELD

The present disclosure relates to a mobile terminal capable of sensing a gesture that is applied to a region outside of a main body of the mobile terminal and a method of controlling the mobile terminal.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Furthermore, there is an increasing demand for a new user interface through which functions of the mobile terminal are conveniently controlled with a simple operation in the vicinity of the mobile terminal.

DISCLOSURE OF THE INVENTION

Therefore, an object of the present invention is to provide a mobile terminal in which a new type of input method associated with control of the mobile terminal is available.

Another aspect of the detailed description is to provide a mobile terminal that is controllable with a gesture that is applied in the vicinity of the mobile terminal.

To achieve these and other advantages and in accordance with the purpose of the present invention, as embodied and broadly described herein, there is provided a mobile terminal including: a main body; a display unit that is arranged to the main body and to which screen information is output; a sensing unit that senses a gesture that is applied to a region outside of the main body; and a controller that performs a function associated with at least one portion of the screen information that is output to the display unit if a predetermined-type gesture is applied to the region outside of the main body.

In the mobile terminal, the region outside of the main body may include multiple regions that correspond to multiple edges of the main body, respectively, and the controller may perform a function that differs based on a drag gesture that is applied along different edges within the multiple regions that correspond to the multiple edges, respectively.

In the mobile terminal, if the drag gesture is applied along one edge of the main body, the controller may perform a function of scrolling a page that corresponds to the screen information, and if the drag gesture is applied along a different edge perpendicular to the one edge, the controller may switch a page corresponding to the screen information to a different page.

In the mobile terminal, when the predetermined-type gesture is applied to one point on the region outside of the main body, the controller may output an indicator to the display unit, the indicator may be moved with application of a first type gesture to the region outside of the main body, and a point at which the indicator is positioned may be selected in response to application of a second type gesture different from the first type gesture to the region outside of the main body.

In the mobile terminal, the region outside of the main body may include multiple regions that correspond to multiple edges of the main body, respectively, and the associated function may be determined based on the gestures that are applied to at least two regions among the multiple regions that correspond to the multiple edges, respectively.

In the mobile terminal, when drag gestures that are applied to one region and the other region among the at least two regions, respectively, are a pinch-in gesture or a pinch-out gesture, the controller may reduce or enlarge a page corresponding to the screen information.

In the mobile terminal, if at least two of the pinch-in gestures are applied to the at least two regions, respectively, the controller may capture the screen information that is output to the display unit.

In the mobile terminal, the gestures that are applied to the at least two regions may be a first type gesture and a second type gesture different from the first type gesture, respectively and the controller may perform a function that differs according to a position at which the first type gesture is applied within the multiple regions.

In the mobile terminal, when the first type gesture is applied to a first region, one region among the multiple regions, and then the second type gesture is applied to a second region that lies in the direction opposite to the first region, the controller may perform a sound volume control function, and when the first type gesture is applied to the second region and then the second type gesture is applied to the first region, the controller may perform a brightness control function.

In the mobile terminal, the multiple regions may include at least one among regions that correspond to corners, respectively, at which the multiple edges intersect, and when the first type gesture is applied to any one among the regions that correspond to the corners, respectively, and the second type gesture is applied to any one among the regions that correspond to the edges of the main body, respectively, the controller may execute a predetermined application.

In the mobile terminal, the second type gesture may be a drag gesture that is applied along the edge of the main body, and the controller may execute an application that differs according to a direction in which the drag gesture is applied.

In the mobile terminal, the function that is performed based on the gesture that is applied to the region outside of the main body may be determined based on an operation mode for the mobile terminal.

In the mobile terminal, when the mobile terminal is in a first operation mode, the controller may perform a first function based on the gesture that is applied to the region outside of the main body, and when the mobile terminal is in a second operation mode different from the first operation mode, the controller may perform a second function different from the first function, based on the gesture.

In the mobile terminal, if a scroll function is performed with a drag gesture that is applied to the region outside of the main body, the controller may perform control in such a manner that a scroll speed differs according to a distance from the main body to a position at which the drag gesture is applied.

In the mobile terminal, when in a state where the display unit is inactivated, the predetermined-type gesture is applied to the region outside of the main body, the controller may perform the associated function and maintains the inactivated state of the display unit.

According to another aspect of the present invention, there is provided a method of controlling a mobile terminal, including: outputting screen information; sensing a gesture that is applied to a region outside of a main body; and performing a function associated with at least one portion of the screen information that is output to a display unit if a predetermined-type gesture is applied to the region outside of the main body.

In the method, the region outside of the main body may include multiple regions that correspond to multiple edges of the main body, respectively, and the performing of the associated function may include performing a function that differs based on a drag gesture that is applied along different edges within the multiple regions that correspond to the multiple edges, respectively.

In the method, the performing of the associated function may include performing a function of scrolling a page that corresponds to the screen information if the drag gesture is applied along one edge of the main body and switching a page corresponding to the screen information to a different page if the drag gesture is applied along a different edge perpendicular to the one edge.

In the method, the performing of the associated function may include outputting an indicator to the display unit, the indicator may be moved with application of a first type gesture to the region outside of the main body when the predetermined-type gesture is applied to one point on the region outside of the main body, and a point at which the indicator is positioned may be selected in response to application of a second type gesture different from the first type gesture to the region outside of the main body.

In the method, the region outside of the main body may include multiple regions that correspond to multiple edges of the main body, respectively, and the associated function may be determined based on the gestures that are applied to at least two regions among the multiple regions that correspond to the multiple edges, respectively.

According to the present invention, a specific function or a general operation by the mobile terminal is controlled in response to the gesture that is applied to the region outside of the main body of the mobile terminal. Therefore, the user can apply a control command to the mobile terminal without covering the display unit. Accordingly, the user can efficiently use information that is output to the display unit.

In addition, according to the present invention, a function associated with the screen information is performed in response to the gesture that is applied to the region outside of the main body of the mobile terminal. Therefore, the user can solve the problem that the space (region) of the display unit to which the touch is applied is limited due to limitation to the size of the display unit.

In addition, according to the present invention, a function associated with the screen information is performed in response to the gesture that is applied to the region outside of the main body of the mobile terminal. Therefore, the user can prevent a malfunction that results from applying the touch to the display unit, by performing the function with the application of the gesture to the region outside of the main body.

In addition, according to the present invention, a specific function is performed based on the gesture that is applied to the region outside of the main body while maintaining the inactivated state of the display unit. Therefore, on the user side, a specific function is performed without omitting a step of activating the display unit and the like. Thus, convenience is improved, and on the mobile terminal side, power consumption necessary for activating the display unit is reduced.

According to the present invention, a specific function or a general operation by the mobile terminal is controlled in response to the gesture that is applied to the region outside of the main body of the mobile terminal. Therefore, the user can apply a control command to the mobile terminal without covering the display unit. Accordingly, the user can efficiently use information that is output to the display unit.

In addition, according to the present invention, a function associated with the screen information is performed in response to the gesture that is applied to the region outside of the main body of the mobile terminal. Therefore, the user can solve the problem that the space (region) of the display unit to which the touch is applied is limited due to limitation to the size of the display unit.

In addition, according to the present invention, a function associated with the screen information is performed in response to the gesture that is applied to the region outside of the main body of the mobile terminal. Therefore, the user can prevent a malfunction that results from applying the touch to the display unit, by performing the function with the application of the gesture to the region outside of the main body.

In addition, according to the present invention, a specific function is performed based on the gesture that is applied to the region outside of the main body while maintaining the inactivated state of the display unit. Therefore, on the user side, a specific function is performed without omitting a step of activating the display unit and the like. Thus, convenience is improved, and on the mobile terminal side, power consumption necessary for activating the display unit is reduced.

BRIEF DESCRIPTION OF THE DRAWINGS

FIGS. 4A, 4B, 4C, 4D, 4E, 5A, 5B, 5C, 5D, 5E, 6A, 6B, 6C, 7A, 7B, and 7C are diagrams for describing methods of providing a specific function based on a gesture that is applied to a region outside of a main body according to one embodiment of the present invention;

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1A:
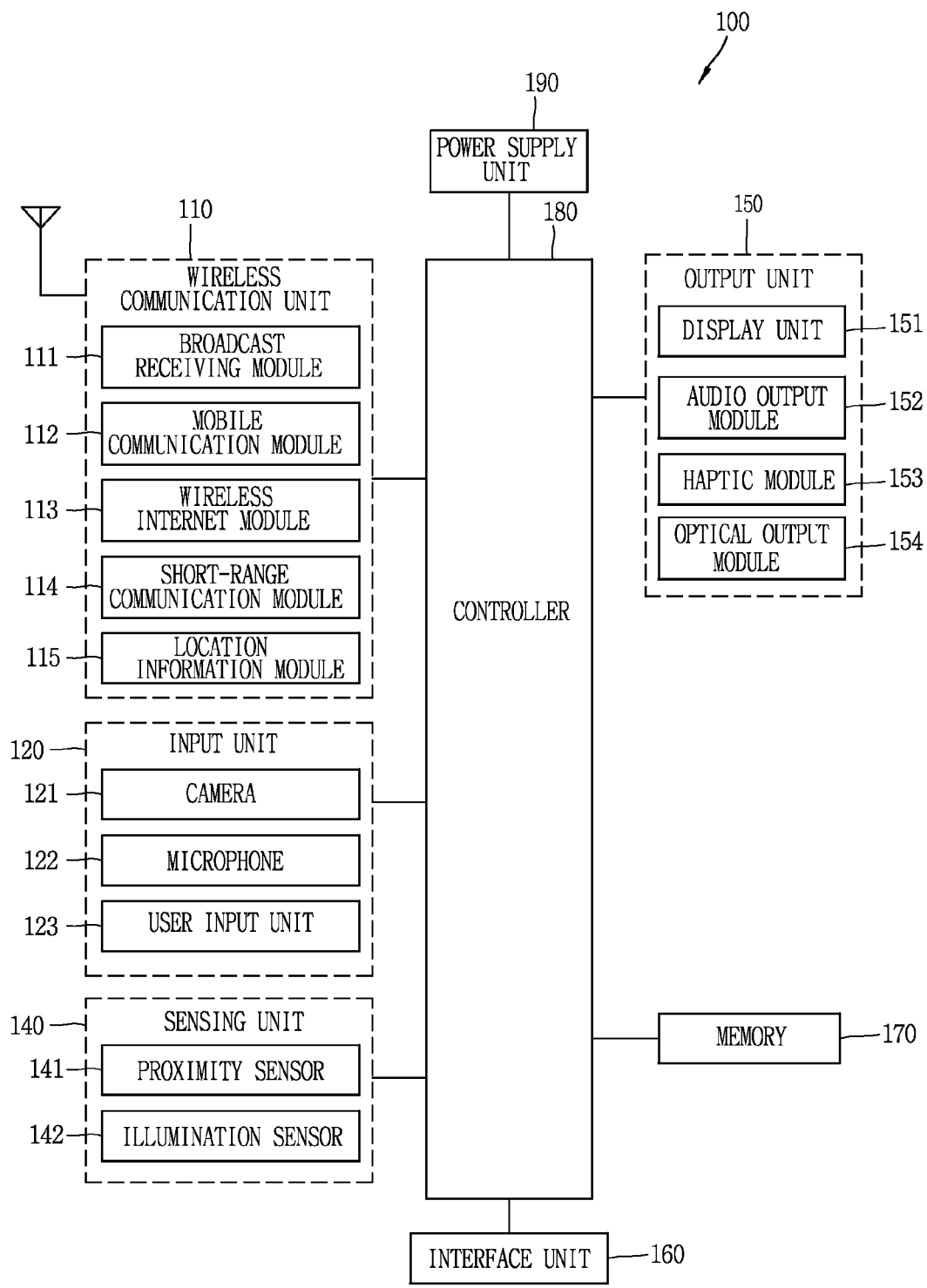
FIG. 1A is a block diagram for describing a mobile terminal according to the present invention.
Figure 1B:
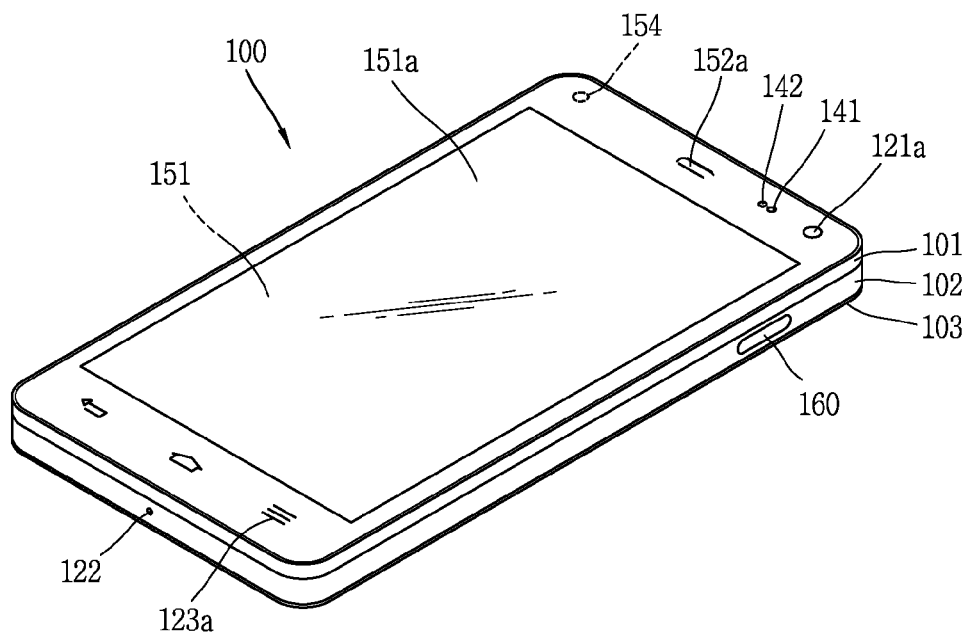
FIGS. 1B and 1C are diagrams illustrating the mobile terminal according to one embodiment of the present invention when viewed from different directions.
Figure 1C:
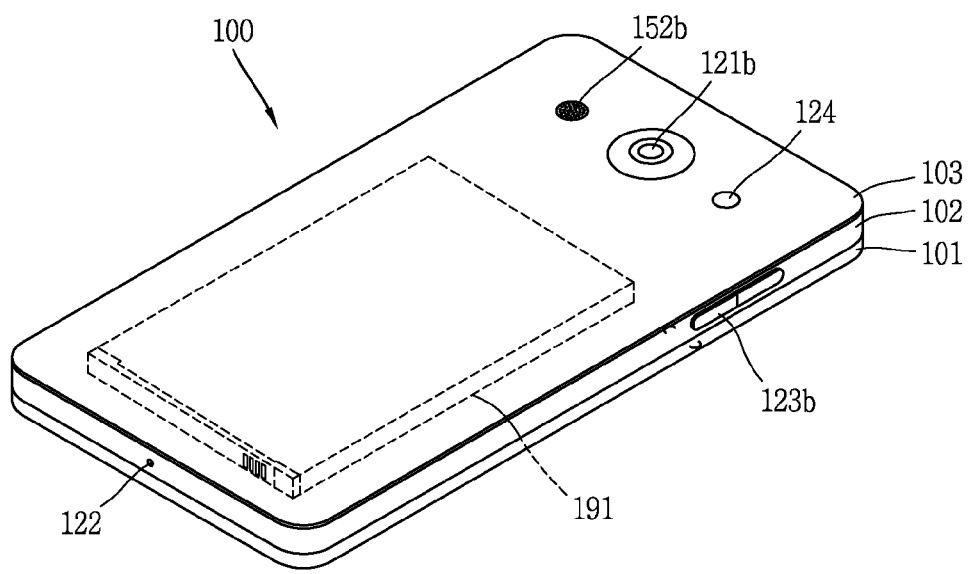

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 1C, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body. And the second audio output module 152b and the second camera 121b are arranged on a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver, and the second audio output module 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can be also provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

On the other hand, in the mobile terminal according to one embodiment of the present invention, which is capable of including at least one or more of the constituent elements as described above, a gesture is sensed that is applied to a region outside of a main body of the mobile terminal. In addition, functions of the mobile terminal according to the present invention are controlled based on the sensed gesture.

The functions of the mobile terminal include functions associated with at least one or more among pieces of screen information that are displayed on a display unit. The associated functions include a scroll function, a page switch function, a zoom-in/out function, a volume control function, a brightness control function, a function associated with reproduction of a moving image/music, a capture function, and the like.

That is, in the mobile terminal according to one embodiment of the present invention, the function or an application that is being executed on the mobile terminal is controlled in response to the gesture. In addition, in the mobile terminal according to one embodiment of the present invention, the function that is executable or drivable on the mobile terminal is executed based on the gesture that is applied to the region outside of the main body.

Therefore, even though the user does not apply a separate operation (for example, a touch input, and the like) to the main body of the mobile terminal, he/she can control at least one function among the functions that are executable on the mobile terminal, by applying the gesture to the region outside of the main body.

Figure 2:
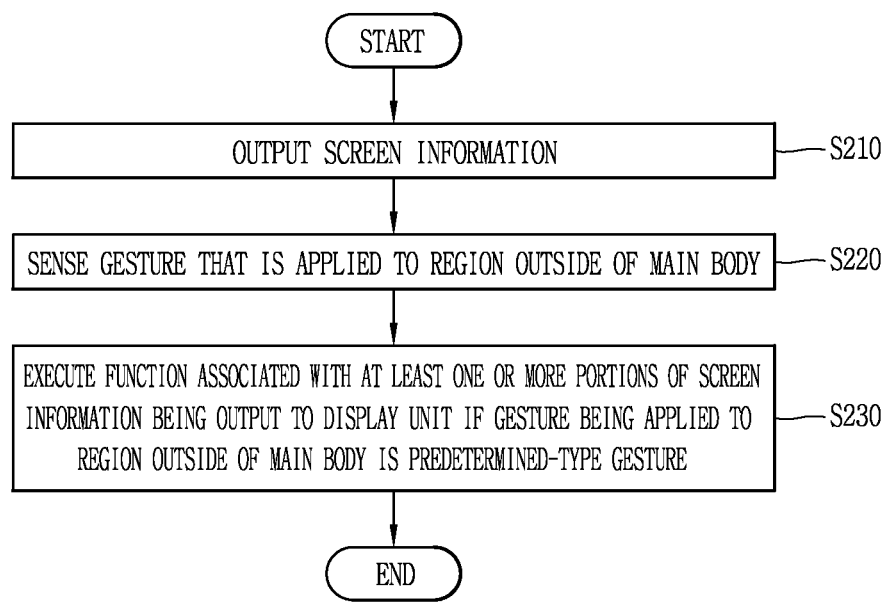
FIG. 2 is a flow chart representatively illustrating a control method according to the present invention.

A mobile terminal that is capable of providing a new user interface based on a gesture that is applied to a region outside of its main body, and a method of controlling the mobile terminal are described in more detail below referring to the accompanying drawings. FIG. 2 is a flow chart illustrating the control method according to the present invention. FIGS. 3A and 3B are diagrams for describing for the control method that is described referring to FIG. 2.

Referring to FIG. 2 and FIGS. 3A and 3B, a step of outputting screen information 400 to a display unit 151 arranged on a main body of the mobile terminal proceeds (S210). At this point, as the screen information, there are various types of information that can be output on the display unit 151 of the mobile terminal. For example, as the screen information, there are an execution screen of an application, a menu screen, a locking screen, or a home screen page. The types of screen information that are output to the display unit 151 are determined based on user's selection, or under the control of the control unit 180.

On the other hand, as in S210, the controller 180 according to the present invention senses the gesture that is applied to the main body in a state where the screen information 400 is output to the display unit 151 (S220).

The region 300 outside of the main body is formed around the main body.

Specifically, the region 300 outside of the main body means a region that is formed by connecting points that are positioned by a predetermined distance away from the main body, around the main body. The predetermined distance means a distance within which the sensing unit 140 can sense the gesture, and differs according to a type of sensor that senses the gesture that is applied to the region outside of the main body. That is, a size of the region outside of the main body differs according to a type of sensor that is used in sensing the gesture and a distance within which the sensor can sense the gesture.

The region 300 outside of the main body is divided into multiple sub-regions. The main body, when viewed from above, is defined as having multiple edges and multiple corners at which at least two of the multiple edges intersect. The region 300 outside of the main body, which are divided into the multiple regions, includes sub-regions 300a, 300b, 300c, and 300d that correspond to the multiple edges, respectively, and sub-regions 300e, 300f, 300g, and 300h that correspond to the multiple corners, respectively.

The region that corresponds to the edge of the main body, respectively, and the region that corresponds to the corner of the main body include not only a region that lies in a lateral-surface direction of the main body, but also regions that lie in front and rear surface directions of the main body. That is. the region includes all regions outside of the mobile terminal, within which the gesture is sensible from the mobile terminal, when the mobile terminal is viewed from above.

However, for convenience in description, a case where the gesture is applied to the region that lies in the lateral direction of the main body around the main body is described. Therefore, it is apparent to a person of ordinary skill in the art that the present invention applies to a case where the gesture is applied to the regions that lie in front and rear surface directions of the main body.

Furthermore, in FIG. 3(a), among the regions outside of the main body (the regions formed around the main body), reference numbers 300a, 300b, 300c, and 300d are assigned to the regions that correspond to the edges of the main body, respectively, and reference numbers 300e, 300f, 300g, and 300h are assigned to the regions that correspond to the corners of the main boy. However, in the present specification, the reference numeral is not assigned fixedly to the region. If according to one embodiment, it is necessary to describe the regions outside of the main body separately, positions of the reference numerals 300a to 300h are changed for illustration. That is, it should be noted that the reference numerals 300a to 300h are used to distinguish positions of the gestures being applied within the region 300 from one anther more definitely.

In addition, contents that apply to the entire region out of the main body without the need to distinguish the multiple regions that make up the region outside of the main body are described using the expression, the "region 300 out of the main body" instead of the reference numerals for indicating the regions that correspond to the edges and that correspond to the corners.

On the other hand, the gesture that is applied to the region 300 outside of the main body means a gesture that is made in the vicinity of the main body. Tools with which the gesture is applied include solid things with which an external force can be applied to an object. As the solid things, for example, there are a human finger, a stylus pen, a pen, a pointer, a human fist. That is, the tools are not limited to the solid things with which the touch input is applied to the mobile terminal, and any type of solid thing may be possible as long as the external force can be applied to the object using the solid thing.

In addition, the gesture means a motion of the tool to the object on which the mobile terminal is placed in the vicinity of the mobile terminal 100. More specifically, it is understood that the gesture is a motion of the tool to the object (for example, a table) on which the main body is placed within the region outside of the main body.

It is understood that the gesture is one example of proximity touch. The gesture is applied, similarly to or in the same as a type of touch input that is applied to the display unit. The gesture is applied, similarly to or in the same as a type of touch input that is applied to a touch screen. As the type of touch input that is applied to the touch screen, there are a short touch, a double short touch, a long touch, multi-touch, a drag touch, a flick touch, a pinch-in touch, a pinch-out touch, a swype touch, a hover touch. For example, as the gesture that is applied to the region 300 out of the main body, there are a short press (or tap) gesture, a double short press (or double tap) gesture, a long press gesture, a multi-press gesture, a drag gesture, a flick gesture, a pin-in gesture, a pinch-out gesture, a swype gesture, a hovering gesture.

However, it should be understood that in addition to the type of gesture that is the motion of the tool to the object on which the main body is placed, the gestures include motions that are made in the air within the region 300 outside of the main body. At this point, if the gesture is the motion that is made in the air, the press means a motion in which the tool stays within the region 300 outside of the main body for a predetermined time, and then goes out of the region 300 outside of the main body. For example, the short press gesture or the long press gesture is a motion in which the tool stays motionlessly at one point on the region 300 outside of the main body for a predetermined time and then after a predetermined time, goes out of the region 300 outside of the main body. As another example, the double short press gesture is a motion in which the short press gesture is applied at least two times for a reference time.

Predetermined gestures that are applied to the region 300 outside of the main body that are described below, include at least one gesture described above.

On the other hand, the controller 180 according to the present invention performs a function of the mobile terminal, based on the gesture that is sensed within the region 300 outside of the main body in Step S220.

Specifically, if the gesture that is applied to the region 300 outside of the main body is a predetermined gesture, a step of performing a function associated with at least one or more portions of the screen information that is output to the display unit 151 proceeds (S230).

The gesture that is sensed in Step S220 is a predetermined-type gesture in conjunction with the function associated with at least one or more display unit 151. That is, although not illustrated, when in a state where the screen information 400 is output to the display unit 151, the gesture is sensed within the region 300 outside of the main body, the controller 180 determines whether the sensed gesture is a gesture in conjunction with execution of the function associated with at least one or more portions of the screen information 400. At this point, the gesture in conjunction with the function associated with at least one or more portions of the screen information 400 is a predetermined-type gesture and the predetermined-type gesture is variously defined (on the other hand, the gesture in conjunction with the execution of the function associated with at least one or more portions of the screen information 400 is described in detail below).

The function associated with at least one or more of the screen information 400 means a function that is being performed, or a function for controlling an application. For example, the associated functions include a scroll function of scrolling a page corresponding to the screen information 400, a page switch function of switching the page corresponding to the screen information 400 to a different page, a selection (execution) function of selecting (executing) a graphic object (or an icon) being output to the screen information 400, a zoom-in/zoom-out function of enlarging/reducing the page corresponding to the screen information 400, a capture function of capturing the screen information 400, and the like. In addition, the associated functions include a brightness adjusting function of controlling brightness of the display unit 151, a sound volume control function of controlling a sound volume of an output unit 152, a control function associated with reproduction of a moving image, a control function associated with reproduction of music, an application execution function of executing a predetermined application, and the like.

Figure 3:
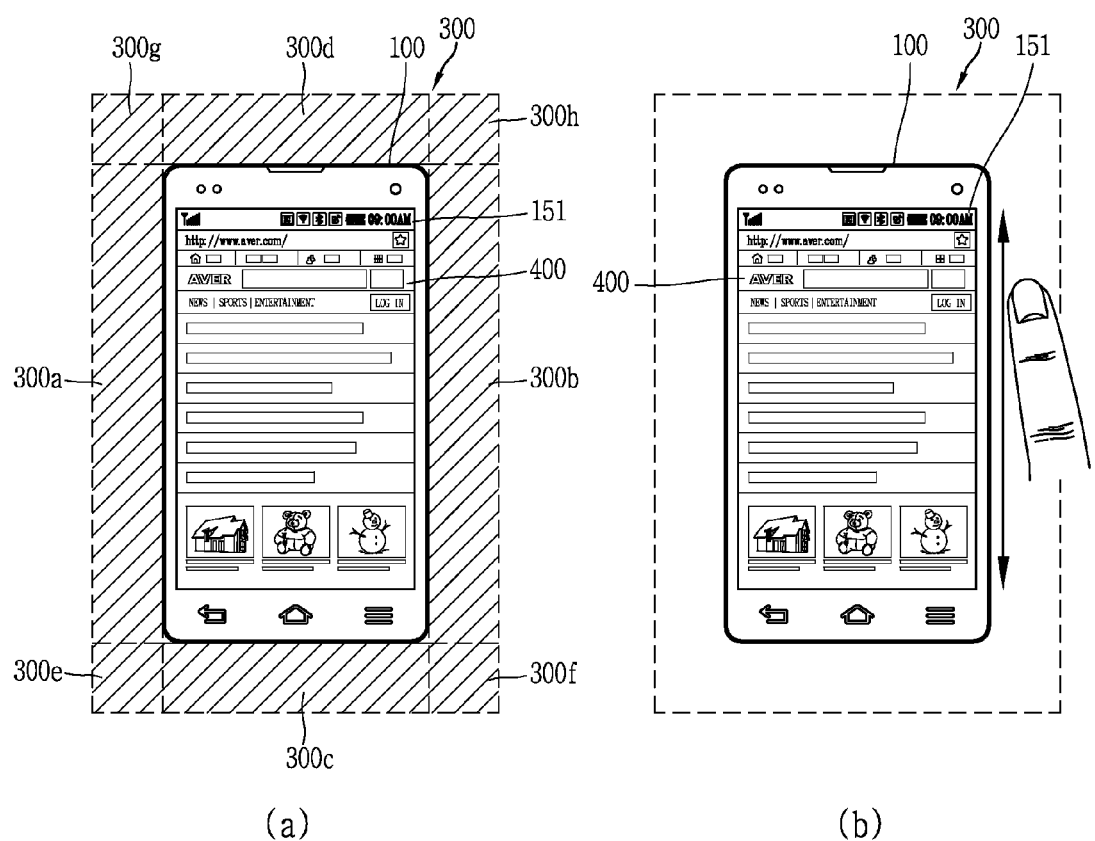
FIG. 3 is diagram for describing the control method that is described referring to FIG. 2.

As one example, as illustrated in FIG. 3(*b*), when the drag gesture is applied along one edge of the main body within the region 300 outside of the main body, the controller 180 performs the scroll function of scrolling the page corresponding to the screen information 400 being output to display unit 151 (a method of executing more various functions is described below referring to the accompanying drawings). Therefore, according to the present invention, if the user performs the scrolling function by applying the gesture to the region 300 outside of the main body, and thus erroneous clicking (erroneous touch) is prevented that selects a wrong graphic object in an unintended manner when the scrolling function is performed by applying a contact touch to the display unit 151.

On the other hand, the controller 180 performs a function that differs based on the drag gesture that is applied along the different edges. The region 300 outside of the main body includes the multiple regions that correspond to the multiple edges of the main body, respectively. When the drag gesture is applied along one edge of the main body within the multiple regions, the controller 180 performs a first function. When the drag gesture is applied along the edge different from the one edge and a different edge, the controller 180 performs a second function different from the first function. The different edge means one among the edge opposite to the one edge and the edge perpendicular to the one edge.

In addition, the controller 180 outputs an indicator 500, based on the application of a predetermined-type gesture to the region 300 outside of the main body.

The indicator 500 is a graphic object that is visually displayed on the display unit in order to select (execute) one point on the screen information 400 or to guide the selection of an icon (or a menu item) displayed on the screen information 400. For example, the indicator 500 is in the form of a cursor or is in the form of a frame that encloses the icon (or the menu item).

When in a state where the indicator 500 is output to the display unit 151, a predetermined-type gesture is applied to the region outside of the main body, the controller 180 processes the gesture as a control command to the indicator 500. Specifically, the controller 180 moves the indicators 500, depending on the application of a first type gesture (for example, the drag gesture) to the region 300 outside of the main body in the outputs state of the indicator 500. In addition, when in the output state of the indication 500, a second type gesture (for example, the short press gesture) different from the first type gesture is applied, the controller 180 selects a point at which the indicator 500 is positioned. Specifically, when based on the application of the second type gesture, a graphic object is selected that is output to the point at which the indicator 500 is positioned, the controller 180 executes a function (or an application) in conjunction with the graphic object.

When in the output state of the indicator 500, the gesture for outputting the indicator 500 is applied again to the region 300 outside of the main body, the controller 180 limits the outputting of the indicator 500. In addition, if in the output state of the indicator 500, the tool with which the gesture for controlling the indicator 500 is applied goes out of the region 300 outside of the main body, the controller 180 limits the outputting of the indicator 500.

Accordingly, the user can be provided with a new user interface through which he/she selects his/her desired point or icon on the screen information that is output to the display unit, by utilizing the region outside of the main body.

On the other hand, the function associated with at least one or more portions of the screen information is executed based on the gestures that are applied to at least two regions among the multiple regions that make up the region 300 outside of the main body. The multiple regions include the regions that correspond to the multiple edges of the main body, respectively, and the regions that correspond to the multiple corners of the main body, respectively. If the gestures that are applied to at least two regions among the multiple regions are predetermined-type gestures, the controller 180 performs functions in conjunction with the gestures.

More specifically, the gestures that are applied to at least two regions have the first type gesture and the second type gesture different from the first type gesture. The controller 180 performs a function that differs according to a position within the multiple regions, to which the first type gesture is applied.

For example, when the first type gesture is applied to a first region, one region among the multiple regions and then the second type gesture is applied to a second region different from the first region, the controller 180 performs the first function. Conversely, when the first type gesture is applied to the second region and then the second type gesture is applied to the first region, the controller 180 performs the second function different from the first function.

The first region and the second region are among the regions that correspond to the multiple edges and that are included in the regions 300 outside of the main body, or among the regions that correspond to the multiple corners that are included in the regions 300 outside of the main body.

Furthermore, the controller 180 performs a function that differs according to a position at which the first type gesture is applied within the first region. For example, the controller 180 performs a different function when the first type gesture is applied to a first point on the first region than when the first type gesture is applied to a second point different from the first point.

Furthermore, in a state where the first type gesture is applied to one region among the multiple regions, the controller 180 performs a function that differs according to a method in which the second type gesture is applied. For example, if the second type gesture is the drag gesture that is applied along one edge of the main body, the controller 180 performs a function that differs according to a direction in which the drag gesture is applied.

As described above, according to the present invention, the function that the user wants to perform is provided using the gesture that is applied to the region outside of the main body, without applying a contact touch to the display unit, by performing or controlling various functions through the gestures that are applied to the multiple regions. Therefore, according to the present invention, the user's need to perform various functions using the region outside of the main body is satisfied.

On the other hand, the function that is performed based on the gesture that is applied to the region 300 outside of the main body is determined based on an operation mode for the mobile terminal 100. With the same gesture, the controller 180 performs a function that differs according to the operation mode for the mobile terminal. Specifically, when the mobile terminal 100 is in an operation mode, the controller 180 performs the first function based on the gesture that is applied to the region 300 outside of the main body. In addition, when the mobile terminal 100 is in a second operation mode different from the first operation mode, the controller 180 performs the second operation different from the first function.

In the operation mode, a function is activated, a function is being executed, or an application is being executed in the mobile terminal 100.

For example, when in a state where a web page is being executed in the mobile terminal, the drag gesture is applied along one edge of the main body within the region 300 outside of the main body, the controller 180 performs the scroll function. In addition, when in a state where a moving image function is being executed in the mobile terminal, the drag gesture is applied, the controller 180 performs a function of controlling at least one among a sound volume and brightness.

Accordingly, according to the present invention, a function suitable for the operation mode for the mobile terminal is provided using the same gesture without the need to use different gestures according to functions. Accordingly, according to the present invention, the number of types of gestures is decreased, and an optimal function is provided according to the operation mode for the mobile terminal. Thus, user convenience is increased.

On the other hand, if the gesture is applied along the region outside of the main body, the controller 180 controls the extent with which a change is made by a specific function, according to a distance from the main body to a position at which the gesture is applied. The specific functions include a scroll function, a brightness control function, a sound volume control function, a moving image fast forward (FF) function and a moving image rewind (Rew) function in reproducing a moving image, and a music fast forward function, a music rewind function, a previous music reproducing function, and a next music reproducing function in reproducing music. The extent of the change means an amount of change in a setting value that is changed by each function.

For example, when the scroll function is performed by the drag gesture that is applied along one edge of the main body within the region 300 outside of the main body, the controller 180 controls a scroll speed differently according to the distance from the main body to a position at which the drag gesture is applied. As one example, when the drag gesture is applied at a second distance that is more remote than a first distance, the controller 180 performs scrolling on a page corresponding to the screen information at a faster scroll speed than when the drag is applied at the first distance.

Accordingly, according to the present invention, the extent of the change is differently controlled according to the distance from the main body to the position at which the gesture is applied to the region outside of the main body, and thus the new user interface is provided that is different from a method in which the extent of the change is controlled differently by applying the contact touch to the display unit 151.

On the other hand, the controller 180 performs the function of the mobile terminal, based on the gesture that is applied to the region 300 outside of the main body in a state where the display unit 151 is inactivated. The functions of the mobile terminal that are performed in the state where the display unit 151 is inactivated include a function of activating the display unit 151, functions that can be performed in the state where the display unit 151 is inactivated, and the like. The function that can be performed in the state where the display unit 151 is inactivated may be a function associated with the music reproducing.

If the music reproducing function is performed and at the same time, the display unit 151 is inactivated, the controller 180 controls the music reproducing function based on the application of a predetermined-type gesture to the region 300 outside of the main body. At this time, while controlling the music reproducing function based on the gesture, the controller 180 maintains the inactivated state of the display unit 151.

As described above, according to the present invention, various functions are performed based on the gesture that is applied to the region 300 outside of the main body without applying the contact touch to the display unit 151. Therefore, according to the present invention, the new user interface is provided through which the function of the mobile terminal is controlled with the gesture that is applied to the region outside of the main body, not with the contact touch that is applied to the display unit 151.

In addition, according to the present invention, a problem (for example, the erroneous click) due to the use of the contact touch is solved.

In addition, according to the present invention, functions that go through various stages using the contact touch before being executed are performed at a time using a predetermined-type gesture. Thus, the user convenience is remarkably increased.

A method of controlling various functions of the mobile terminal using the gesture that is applied to the region outside of the main body is described in more detail below referring to the accompanying drawings. FIGS. 4A, 4B, 4C, 4D, 4E, 5A, 5B, 5C, 5D, 5E, 6A, 6B, 6C, 7A, 7B, and 7C are diagrams for describing methods of providing a specific function based on the gesture that is applied to the region outside of the main body according to one embodiment of the present invention.

First, as an example, a case where the screen information 400 that is output to the display unit 151 is a web page is described referring to FIGS. 4A to 4E. However, contents described below are not applied in such a manner that the contents are limited to the web page. The contents are analogically applicable in the same manner or similarly in a function or an application that is executable on the mobile terminal.

If the gesture that is applied to the region 300 outside of the main body is a predetermined gesture, the controller 180 performs a function associated with at least one or more portions of the screen information 400 that is output to the display unit 151. At this point, the region 300 outside of the main body include the multiple regions 300a and 300b that correspond to the multiple edges of the main body, respectively. The controller 180 performs a function that differs based on the drag gesture that is applied along the different edges within the multiple regions 300a and 300b that correspond to the multiple edges, respectively.

Figure 4A:
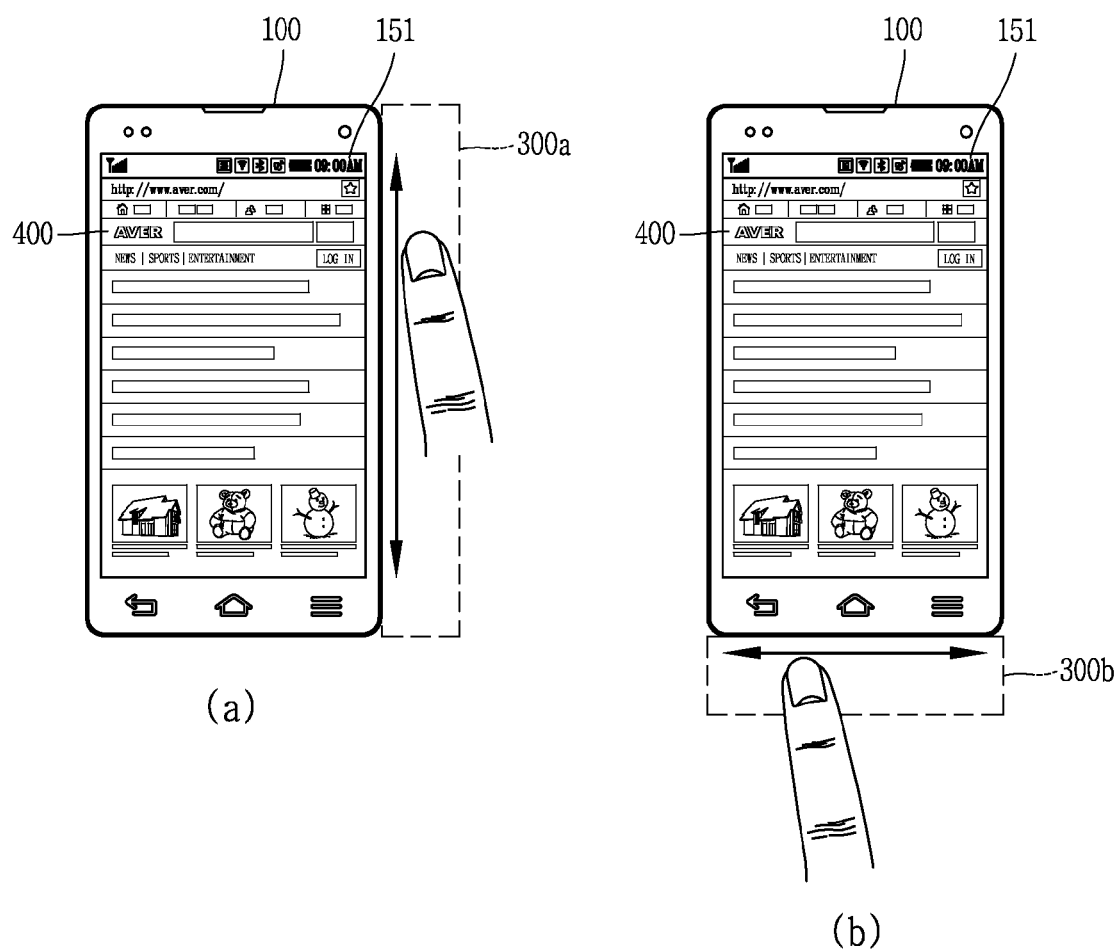

For example, as illustrated in FIG. 4A(a), when the drag gesture is applied along the one edge within the region 300a that corresponds to one edge of the main body, the controller 180 performs the function of scrolling the page corresponding to the screen information 400. In addition, as illustrated in FIG. 4A(b), when the drag gesture is applied along a different edge within the region 300b that corresponds to a different edge of the main body, which is perpendicular to the one edge of the main body, the controller 180 switches the page corresponding to the screen information 400 to a different page.

On the other hand, when a predetermined gesture is applied to one point on the regions 300 outside of the main body, the controller 180 outputs the indicator 500 to the display unit 151. The controller 180 processes as the control command to the indicator 500 a predetermined-type gesture that is applied to the region 300 outside of the main body in the output state of the indicator 500.

Figure 4B:
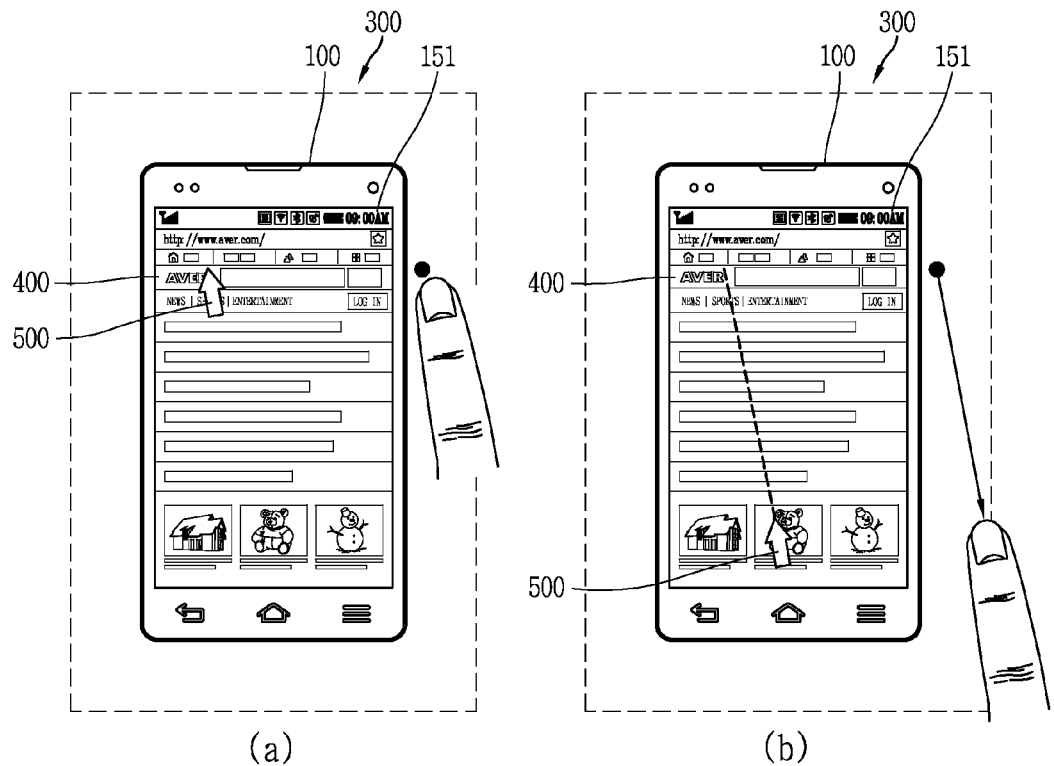
Figure 4B:
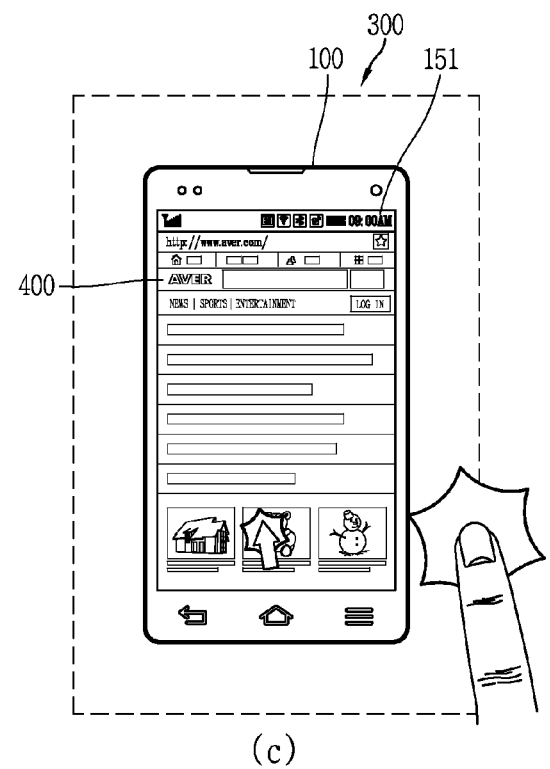

For example, as illustrated in FIG. 4B(a), when a predetermined-type gesture (for example, the long press gesture) is sensed as being applied to one point on the region 300 outside of the main body, the controller 180 outputs the indicator 500 to the display unit 151. Thereafter, in the state where the indicator 500 is output to the display unit 151, as illustrated in FIG. 4B(b), the indicator 500 is moved based on the first type gesture (for example, the drag gesture) that is applied to the region 300 outside of the main body. In addition, as illustrated in FIG. 4B(c), a point is selected at which the indicator 500 is positioned, in response to the application of the second type gesture (for example, the short press gesture) different from the first type gesture to the region 300 outside of the main body. Specifically, when based on the application of the second type gesture, a graphic object is selected that is output to the point at which the indicator 500 is positioned, the controller 180 executes a function (or an application) in conjunction with the graphic object.

When in the output state of the indicator 500, the gesture (for example, the long press gesture) for outputting the indicator 500 is applied again to the region 300 outside of the main body, the controller 180 limits the outputting of the indicator 500. In addition, if in the output state of the indicator 500, the tool (for example, a human finger) with which the gesture for controlling the indicator 500 is applied goes out of the region 300 outside of the main body, the controller 180 limits the outputting of the indicator 500.

On the other hand, as described referring to FIG. 3(a), the region 300 outside of the main body is divided into the regions that correspond to the multiple edges, respectively, and the regions that correspond to the multiple corners, respectively. The multiple edges and the multiple corners make up the boundary of the main body when viewed from above. The controller 180 determines a function associated with at least one or more portions of the screen information 400, based on the gestures that are applied to at least two regions, among the multiple regions.

Figure 4C:
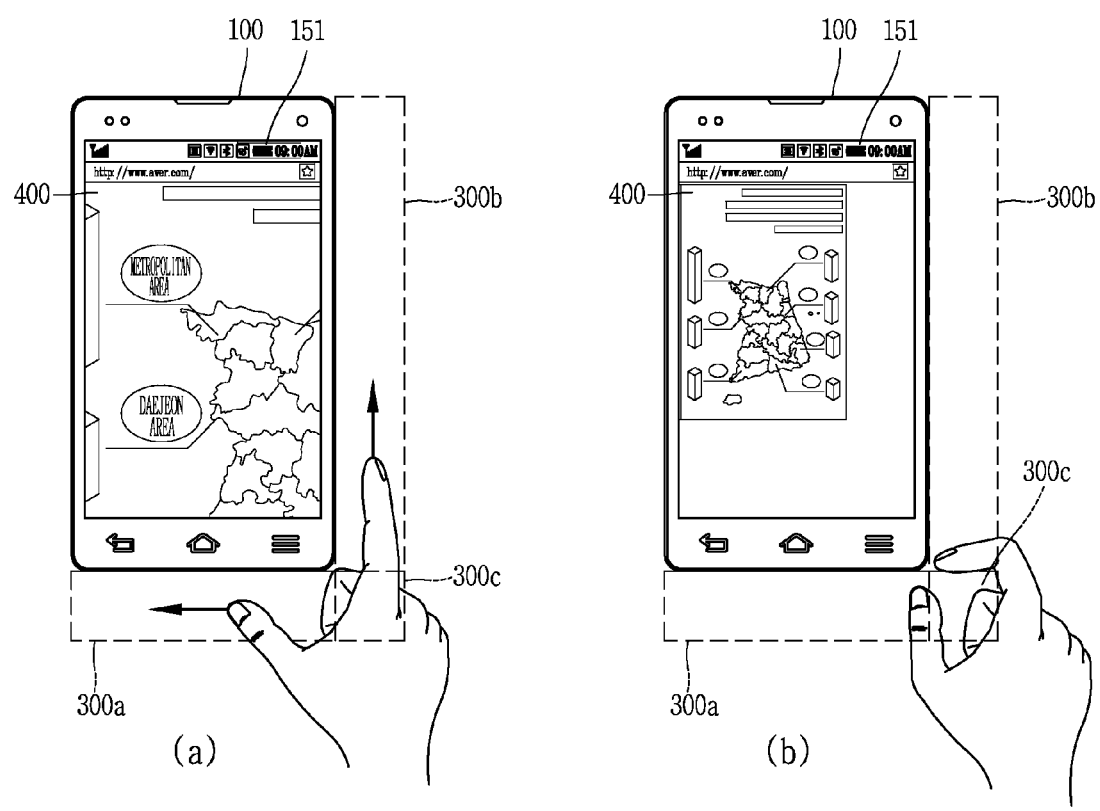

For example, as illustrated in FIG. 4C(a), the controller 180 enlarges (zooms in) the page corresponding to the screen information 400 when the drag gesture is applied within the region 300a, one region and the region 300b, the other region, among at least two regions and the applied drag gestures correspond to the pinch-out gesture. Conversely, as illustrated in FIG. 4C(b), the controller 180 reduces (zooms out) the page corresponding to the screen information 400 when the drag gestures that are applied within the region 300a, one region and the region 300b, the other region, are the pinch-in gesture.

At this point, the drag gestures that are applied within the region 300a, one region and the region 300b, the other region, may be expressed as the pinch-in gesture or the pinch-out gesture that is applied within a region 300c, one region among the regions that correspond to the multiple corners. That is, when the pinch-in gesture is applied within the region 300c, one region among the multiple regions that correspond to the corners, which are among the region 300 outside of the main body, the controller 180 reduces the page corresponding to the screen information 400. When the pinch-out gesture within the region 300c, the controller 180 enlarges the page corresponding to the screen information 400.

Figure 4D:
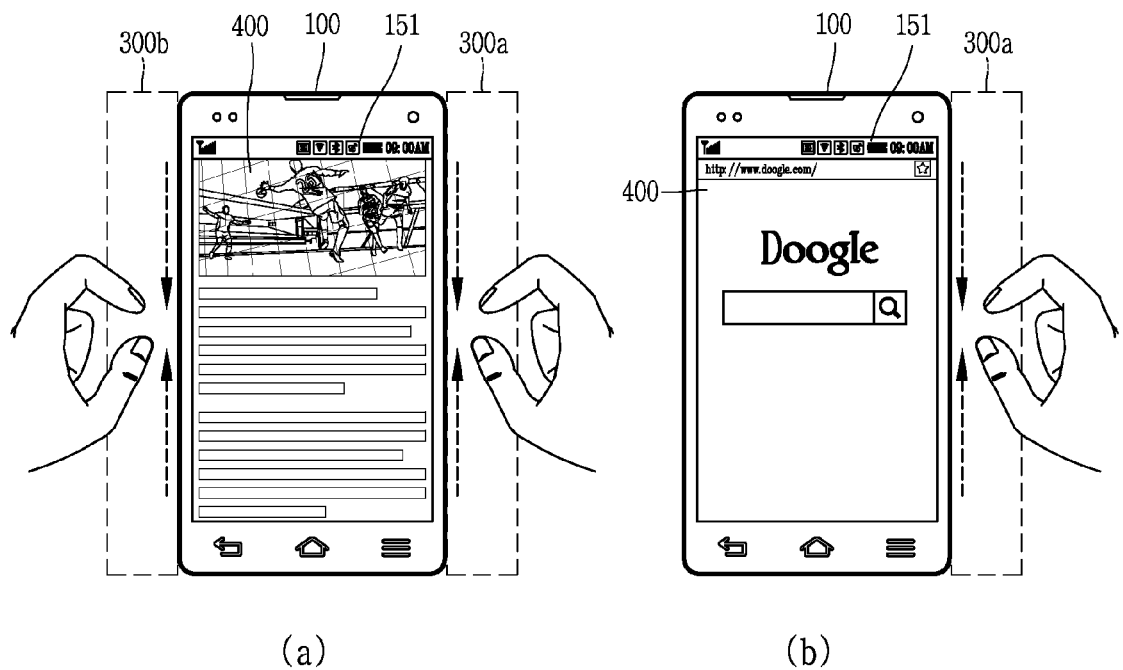
Figure 4D:
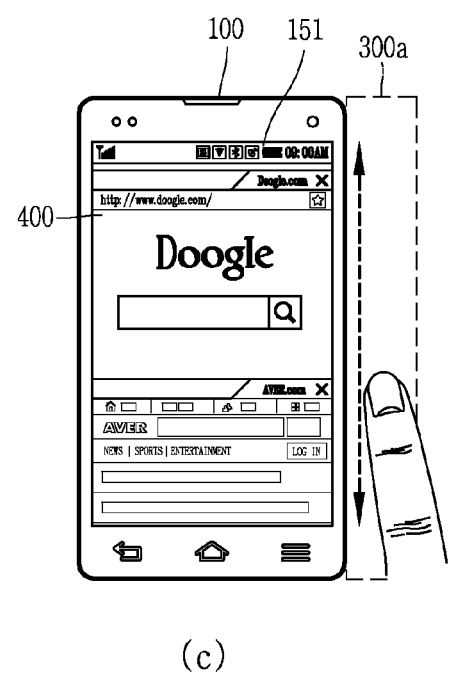

According to another embodiment, when at least two pinch-in gestures are applied within at least two regions, the controller 180 captures the screen information 400 that is output to the display unit 151. As illustrated in FIG. 4D(a), when the pinch-in gestures are sensed as being applied within a region 300a corresponding to one edge and a region 300b corresponding to an edge opposite to the one region, among the region 300 outside of the main body, the screen information 400 that is output to the display unit is captured.

The capture function is not limited to being performed with the pinch-in gestures that are applied within at least two regions, and various modifications may be possible such as when according to user's setting, the capture function is performed based on the pinch-in gesture that is applied within only one region.

On the other hand, when the pinch-in gesture, as illustrated in FIG. 4D(b), is applied within a region 300a corresponding to one edge, among the region 300 outside of the main body, the controller 180, as illustrated in FIG. 4D(c), enters a web page editing mode in which one web page is selected from among the multiple web pages. The web page editing mode means a mode in which at least one web page that was executed in an application that outputs the web page is displayed, and based on the user's selection, one portion of the at least one web page is displayed on the entire output region of the display unit 151. It is understood that the output region of the display unit 151 is a region that does not include a state display line (or a state display bar). The state display line means a region on which to display pieces of state information on the mobile terminal, such as current time, battery state-of-charge information, and signal reception information, or information on surroundings of the mobile terminal.

As illustrated in FIG. 4D(c), in a state where the web page editing mode is entered and thus at least one web page is displayed, the controller 180 selects one web page to be activated, based on the drag gesture that is applied to the region 300a that corresponds to the one edge. Thereafter, although not illustrated, when in a state where the one web page is selected, a predetermined-type gesture (for example, the short press gesture) is applied to the region 300a corresponding to the one edge, the selected one web page is output to the entire output region of the display unit 151.

If the scroll function is performed with the drag gesture that is applied to the region 300 outside of the main body, the controller 180 performs control in such a manner that the scroll speed differs according to the distance from the mobile terminal to the position at which the drag gesture is applied. As one example, as the position at which the drag is applied lies farther away from the main body, the controller 180 performs control in such a manner that the scroll speed is set to be higher.

For example, as illustrated in FIG. 4E(a), when the drag gesture is applied at a first distance from the main body, the controller 180 performs the control in such a manner that the scroll speed is set to be a first speed (for example, 1). In addition, as illustrated in FIG. 4E(b), when the drag gesture is applied at a second distance that is more remote than the first distance from the main body, the controller 180 performs the control in such a manner that the scroll speed is set to be a second speed (for example, 3) that is higher than the first speed. The scroll speed (for example, the first speed and the second speed) is proportional to a distance from the main body to a position at which the drag gesture is applied. In addition, the user sets the scroll speed that depends on the distance from the main body to the position at which the drag gesture is applied.

A method is described in more detail below in which a function associated with the screen information is performed based on the gestures that are applied to at least two regions among the multiple regions that are included in the region 300 outside of the main body. As an example, a case where the screen information 400 that is output to the display unit 151 is a home screen page is described referring to FIGS. 5A to 5E. However, contents to be described below are not applied in such a manner that the contents are limited to the home screen page. The contents are analogically applicable in the same manner or similarly in a function or an application that is executable on the mobile terminal.

The region 300 outside of the main body includes the multiple regions that correspond to the multiple edges, respectively, and the multiple regions that correspond to the multiple corners, respectively. The multiple edges and the multiple corners make up the boundary of the main body.

The controller 180 performs a function associated with at least one or more portions of the screen information 400, based on the gestures that are applied to at least two regions among the multiple regions that correspond to the multiple edges, respectively.

Specifically, the gestures that are applied to at least two regions include the first type gesture and the second type gesture different form the first type gesture.

The controller performs a function that differs according to a position within the multiple regions, to which the first type gesture is applied.

Figure 5A:
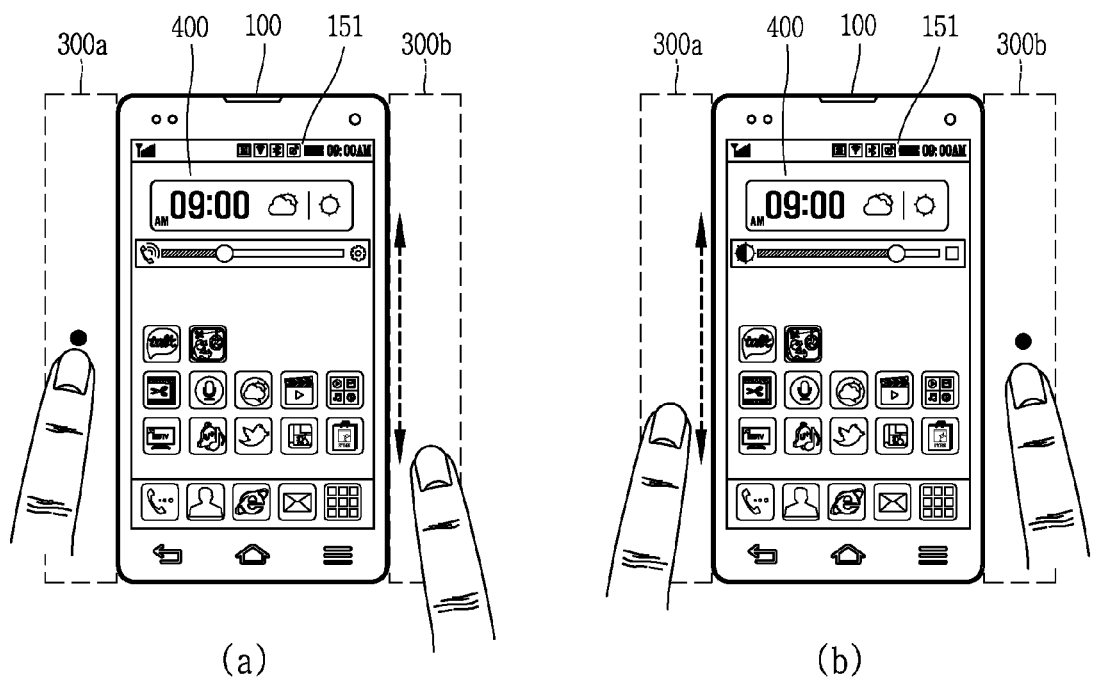

For example, as illustrated in FIG. 5A(a), the controller 180 performs the sound volume control function when the first type gesture (for example, the long press gesture) is applied to the first region 300*a*, one region among the multiple regions and the second type gesture (for example, the drag gesture) is applied to a second region 300*b* that lies in the direction opposite to the first region 300*a*. In addition, as illustrated in FIG. 5A(b), the controller 180 performs the brightness control function when the first type gesture (for example, the long press gesture) is applied to the second region 300*b* and the second type gesture (for example, the drag gesture) is applied to the first region 300*a*.

At this point, the second region 300*b* is not limited to the region that lies in the direction opposite to the first region 300*a*, and may be one region among a region that corresponds to an edge perpendicular to one edge that corresponds to the first region 300*a*, and regions that correspond to the multiple corners, respectively.

On the other hand, the first region is a region 300*c*, one region among the multiple regions that correspond to the multiple corners, respectively.

Figure 5B:
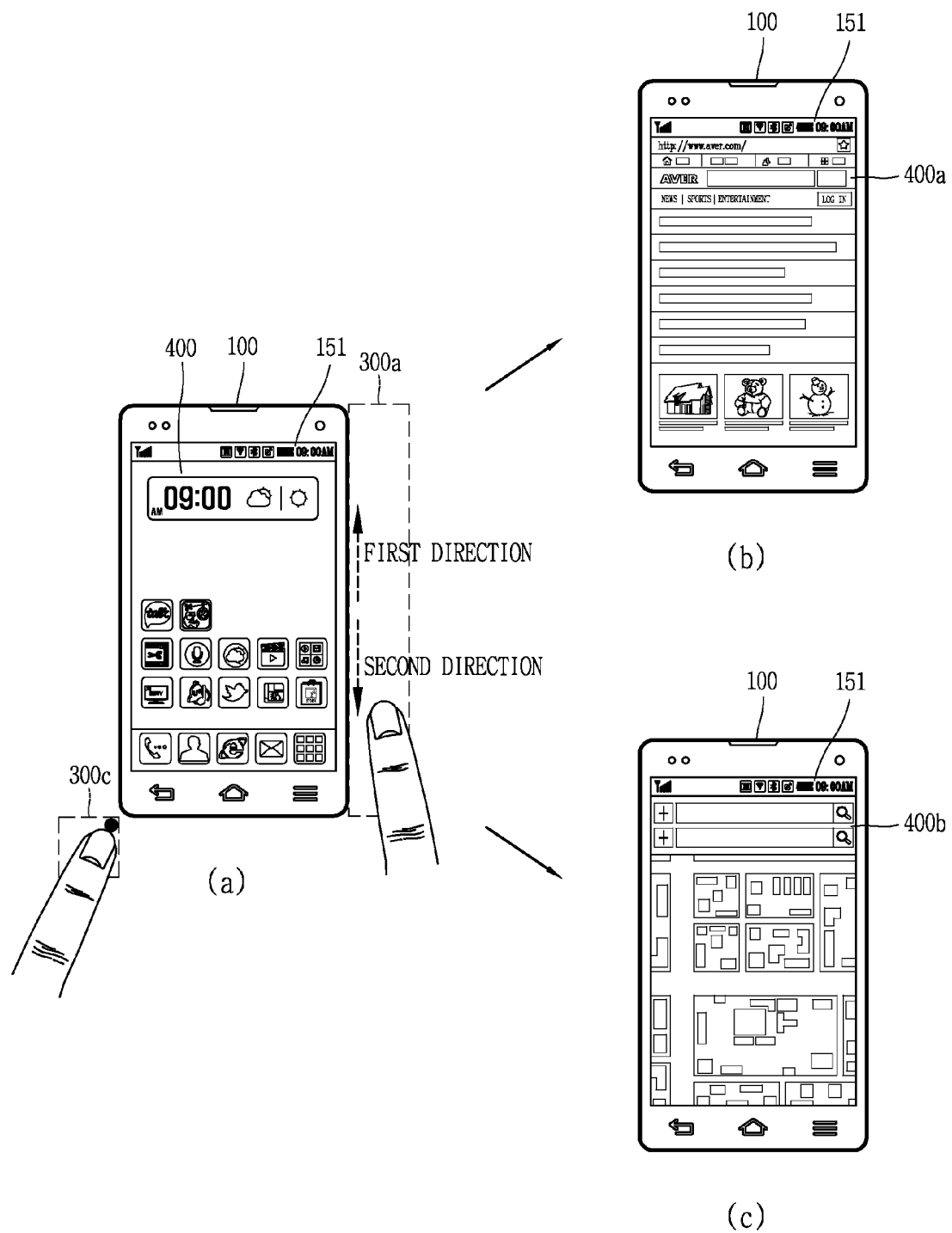
Figure 5C:
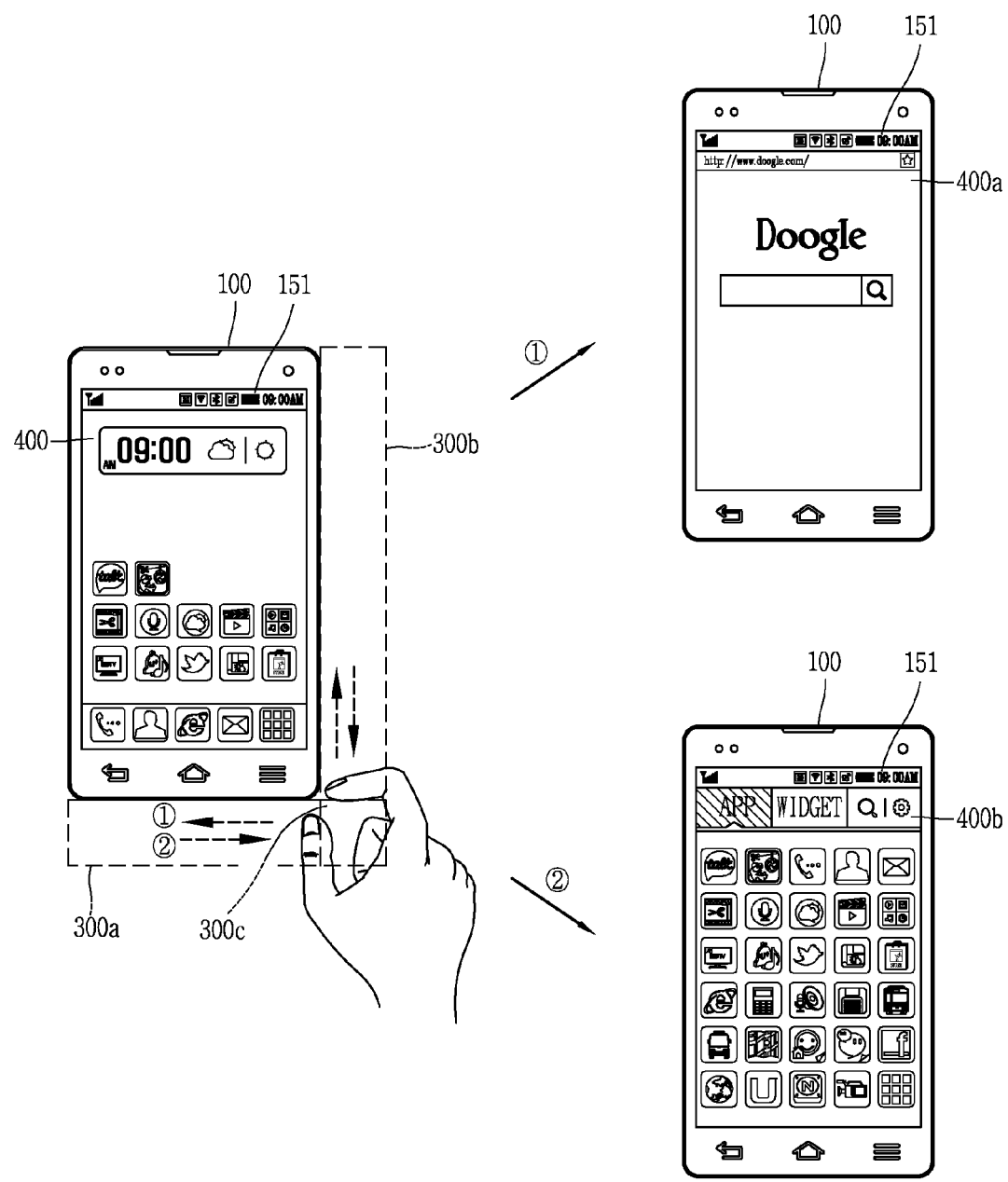
Figure 5D:
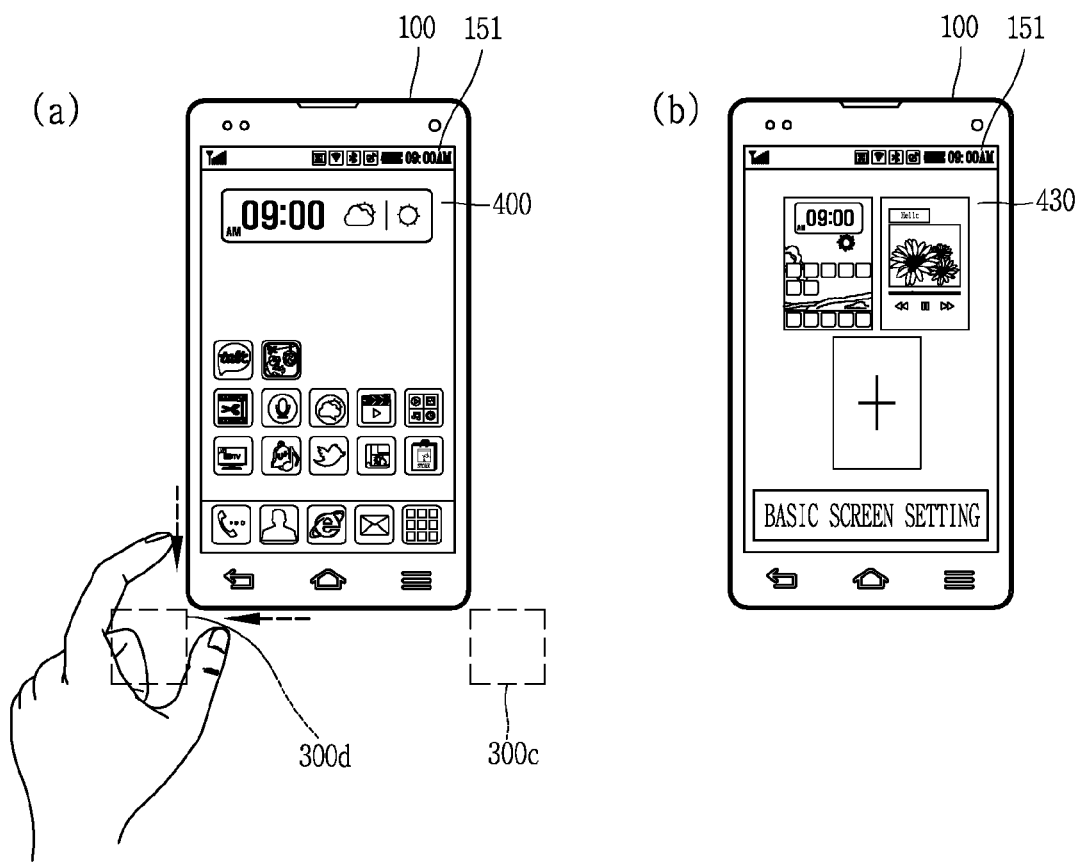
Figure 5E:
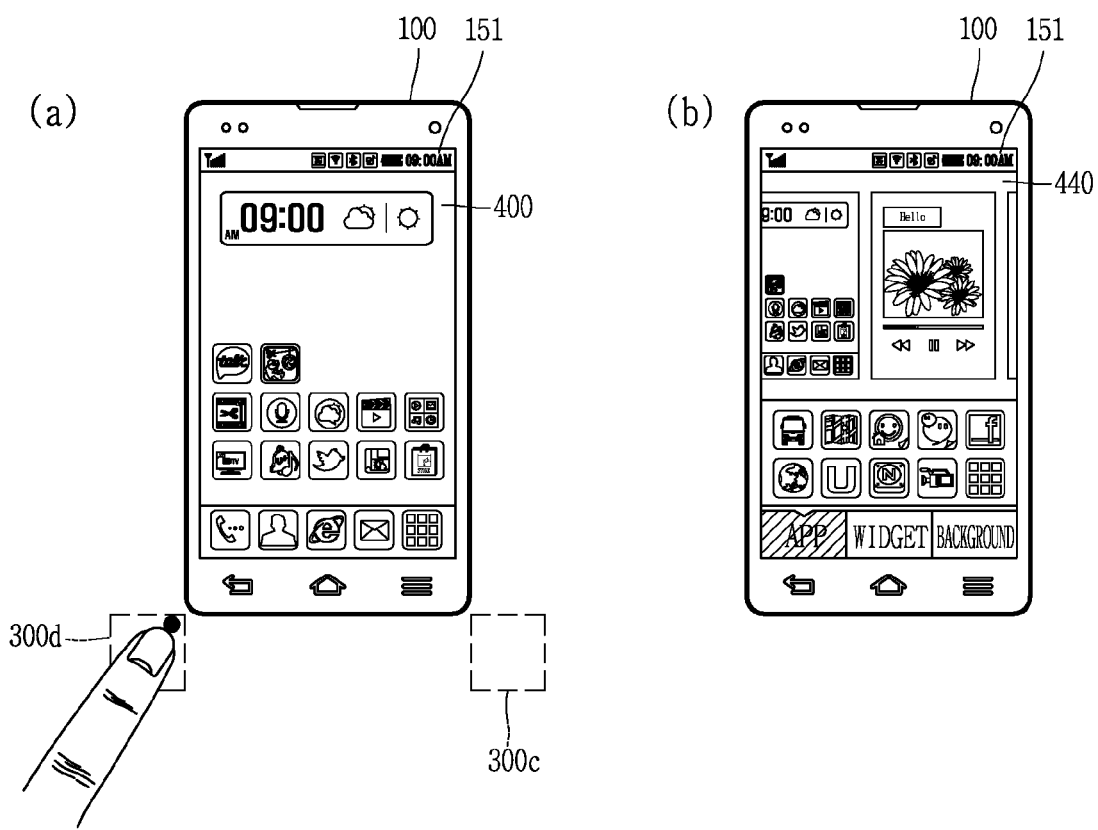

As illustrated in FIG. 5B(a), the controller 180 executes a predetermined application when the first type gesture is applied to the region 300*c*, one region among the regions that correspond to the corners, respectively, and the second type gesture different the first type gesture is applied to one region among the regions that correspond to the edges of the main body, respectively. At this point, if the second type gesture is the drag gesture that is applied along the edge of the main body, the controller 180 performs an application that differs according to the direction in which the drag gesture is applied.

Figure 6A:
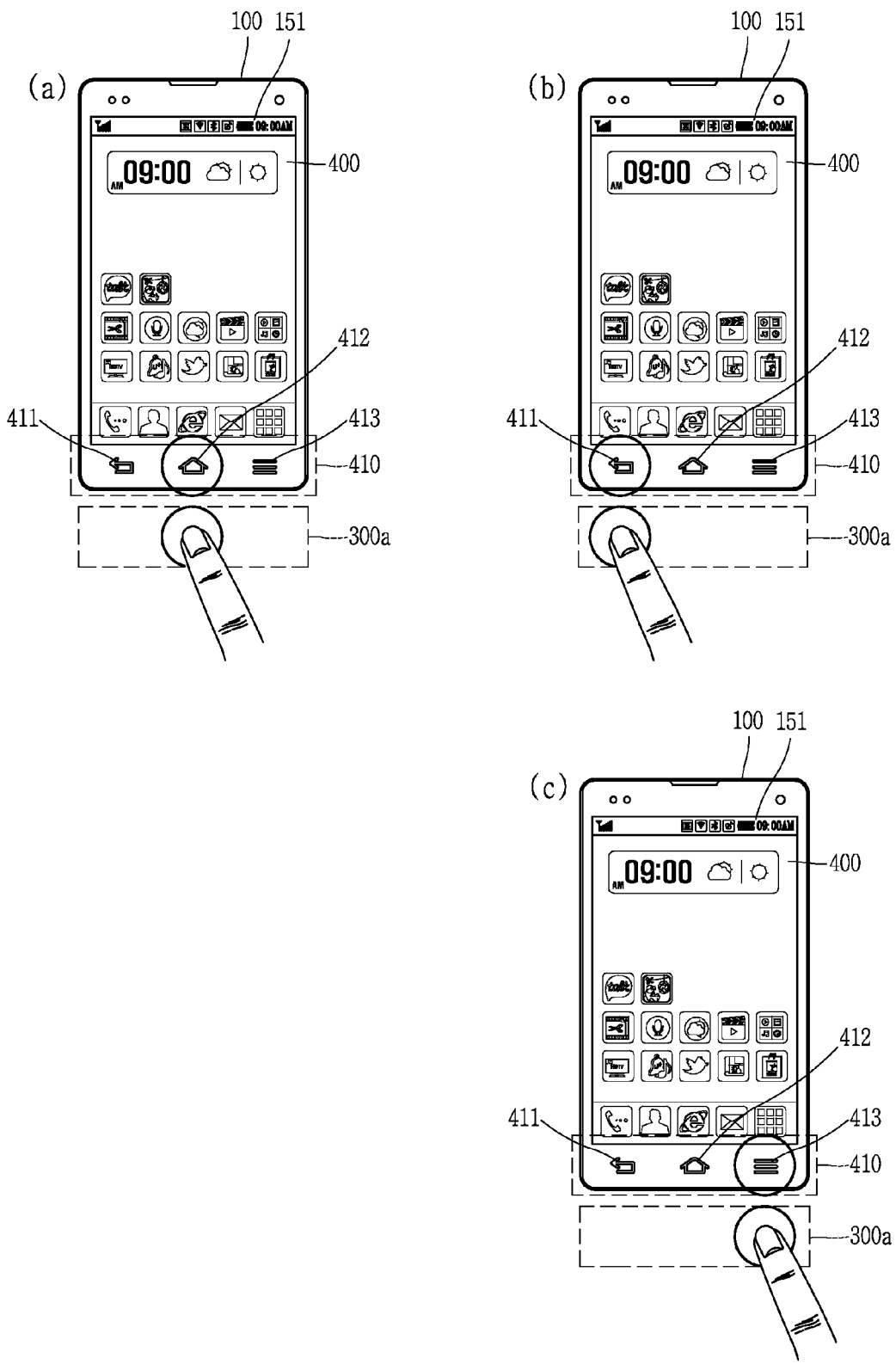
Figure 6B:
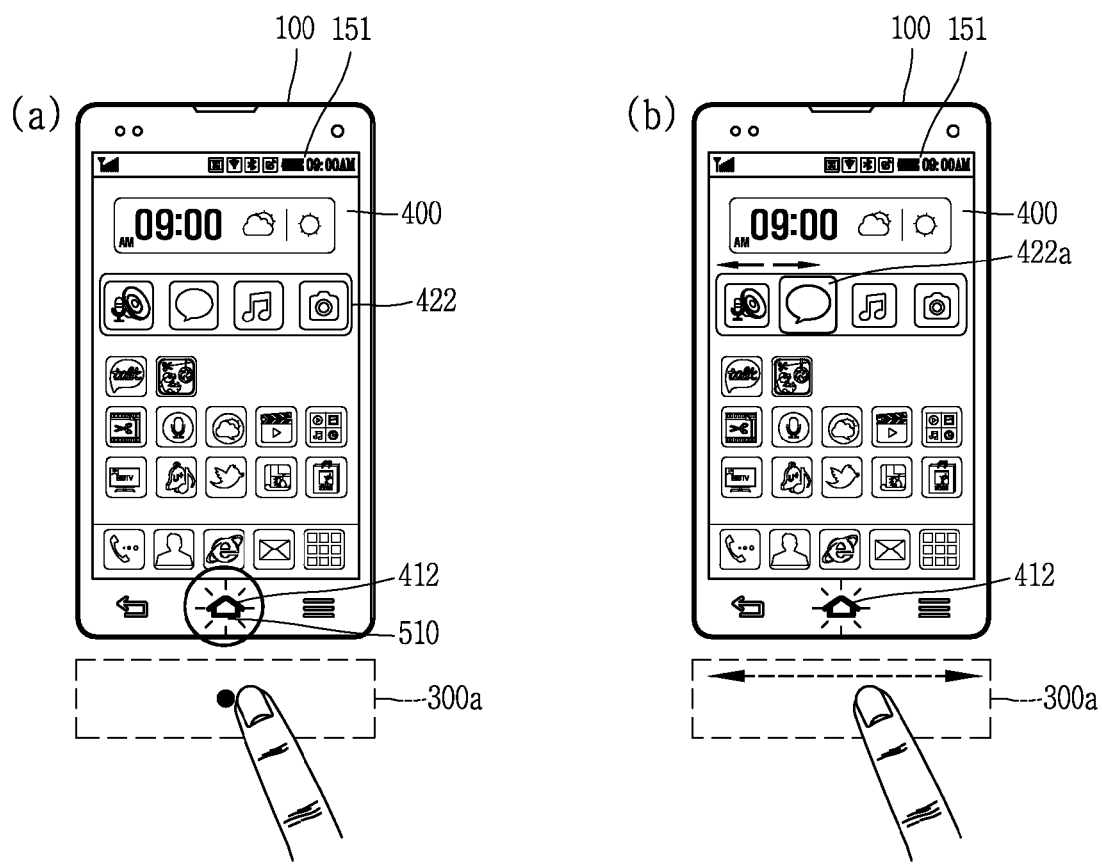

For example, as illustrated in FIG. 6B(a), the controller 180 performs a predetermined application when the first type gesture (for example, the long press gesture) is applied to the region 300*c* that corresponds to the corner of the main body, and the second type gesture (for example, the drag gesture) is applied to the region 300*a* that corresponds to one edge of the main body. At this point, the controller 180, as illustrated in FIG. 6B(b), executes a web page application when the second type gesture (for example, the drag gesture) is applied along the first direction. In addition, the controller 180, as illustrated in FIG. 6B(c), executes a map application when the second type gesture (for example, the drag gesture) is applied along the second direction.

On the other hand, the controller 180 executes a predetermined application when in a state where the home screen page is output to the display unit 151, the drag gestures that are applied within the region 300*a*, one region among at least two regions, and the region 300*b*, the other region, correspond to the pinch-in gesture or the pinch-out gesture.

At this point, the drag gestures that are applied within the region 300*a*, one region and the region 300*b*, the other region, may be expressed as the pinch-in gesture or the pinch-out gesture that is applied within the region 300*c*, one region among the regions that correspond to the multiple corners.

Figure 6C:
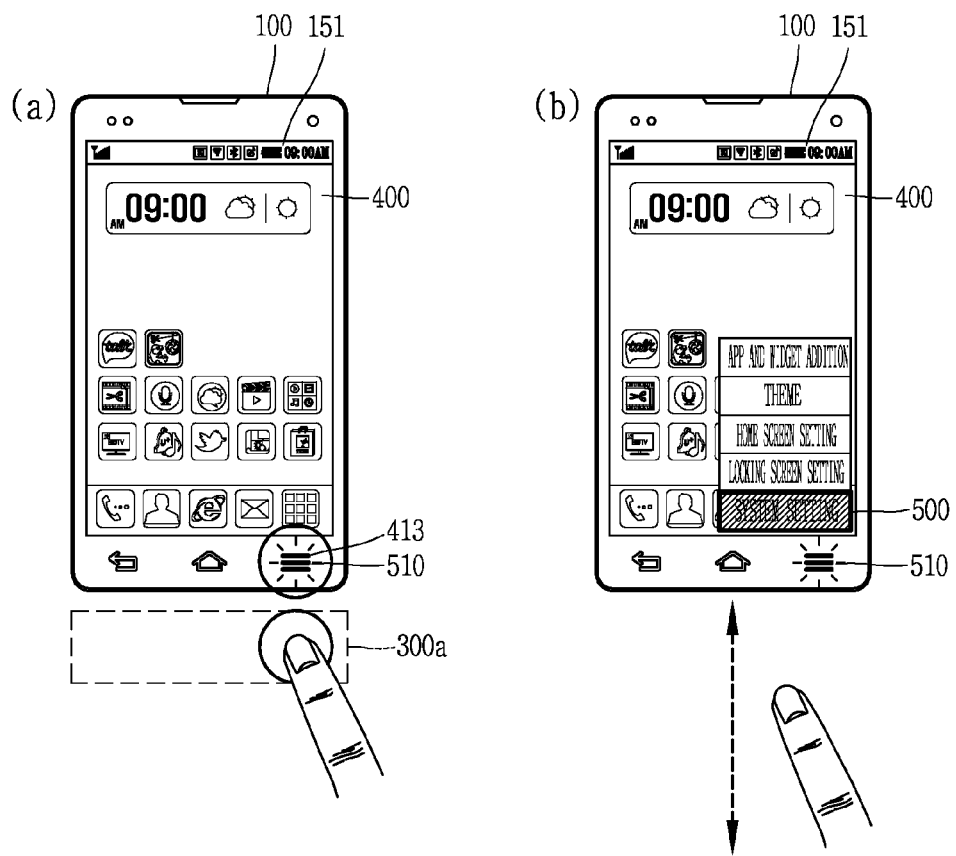
Figure 6C:
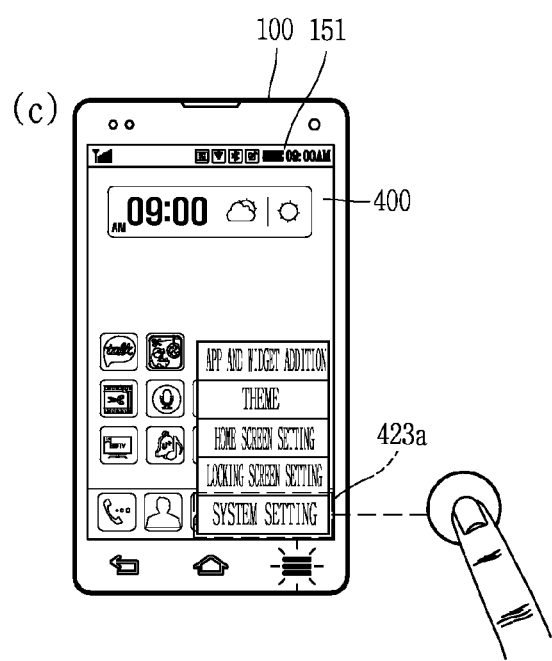

The controller 180 executes an application that differs according to a type of pinch gesture (the pinch-in gesture and the pinch-out gesture) that is applied to the region 300*c*, one region among the regions that correspond to the corners, respectively. For example, as illustrated in FIGS. 6C(a) to 6C(c), when the pinch-out gesture is applied within the region 300*c*, one region among the regions that correspond to the multiple corners, respectively, the controller 180 performs the web page application. Alternatively, when the pinch-in gesture is applied, the controller 180 displays a menu screen page as the screen information 400.

A predetermined application that is executed based on the gesture that is applied to at least two regions among the multiple regions that are included in the region 300 outside of the main body differs according to the user's setting.

On the other hand, the controller 180 performs a function that differs according to a position at which the pinch-in gesture is applied within the regions that correspond to the multiple corners, respectively.

When in a state where a home screen page 400 is output to the display unit 151, the pinch-in gesture is applied to the region 300*c* one region among the regions that correspond to the multiple corners, respectively, and to a different region 300*d*, the controller 180 enters a first editing mode 430 in which the home screen page 400 is edited, without executing a predetermined application. In the editing mode 430, if a button for changing the number of the home screen pages or outputting the screen page is pushed down, among the multiple home screen pages, one home screen page that is to be output to the display unit 151 is set in response to the pushing-down of the button for inputting.

In addition, when the long press gesture is applied to the region 300*c* or 300*d*, one region among the regions that correspond to the multiple corners, respectively, the controller 180 enters a second editing mode in which at least one, among an icon and a widget, can be added to the screen page 400 or a background screen of the home screen page 400 can be changed.

After entering one among the first and second editing modes, as illustrated in FIG. 4B(a) to 4B(c), the controller 180 performs the editing mode using the indicator 500. At this point, the indicator 500 is output to the display unit 151 with a predetermined-type gesture that is applied to one point on the region that corresponds to the edge of the main body, within the region 300 outside of the main body.

When a gesture for entering the first editing mode and the second editing mode is applied to one region and the same gesture is again applied to the one point, the controller 180 returns to the home screen page 400.

As described above, according to the present invention, various functions are performed based on the gesture that is applied to at least two regions among the multiple regions.

Referring to the accompanying drawings, a method is described in more detail below in which in a state where the home screen page is output to the display unit, a specific point or a specific graphic object is selected using the gesture that is applied to the region outside of the main body. FIGS. 6A, 6B, 6C, 7A, 7B, and 7C illustrate a state where the home screen page is output to the display unit. It should be noted that contents to be described below are not applied in such a manner that the contents are limited to the home screen page.

The mobile terminal according to one embodiment of the present invention includes a first operation unit 123*a*, which is provided to a front surface of the body of the mobile terminal. The first operation unit 123*a* includes at least one among a return button 411 that returns to the previous function, a home button 412 that outputs the home screen page to the display unit 151, and a menu button that outputs a menu item.

The return button 411, the home button 412, and the menu button 413 are displayed on the display unit 151 through software processing. If the buttons are displayed on the display unit 151, the buttons are not displayed on the front surface of the body of the mobile terminal.

A predetermined-type gesture is applied to the region 300*a* that corresponds to an edge 410 to which the return button 411, the home button 412, and the menu button 413 are provided (or, that corresponds to an edge of the display unit, to which the return button 411, the home button 412, and the menu button 413 are output). The controller 180 processes the application of the predetermined-type gesture as a control command to select any one among the buttons. Specifically, the buttons 411, 412, and 413 are in conjunction with one point on the region 300 outside of the main body. That is, when a predetermined-type gesture is applied to one point on the region 300 outside of the main body, the controller 180 processes this as selecting of a button in conjunction with the one point. When one button is selected from among the buttons 411, 412, and 413 with the gesture that is applied to one point on the region 300 outside of the main body, the controller 180 performs a function that is assigned to the selected button.

For example, as illustrated in FIG. 6A(a), when a predetermined-type gesture (for example, the short press gesture) is applied to one point corresponding to the home button 412, on the region 300*a* that corresponds to the edge 410 to which the buttons are provided, the controller 180 performs a function (for example, a function of outputting the home screen page to the display unit 151) that is assigned to the home button 412. Also in FIGS. 6A(b) and 6A(c), when a predetermined-type gesture (for example, the short press gesture or the double shot press (double tap) gesture is applied to one point that corresponds to each button, the controller 180 performs a function that is assigned to the one point to which the predetermined-type gesture.

On the other hand, when the long press gesture, as illustrated in FIG. 6B(a), is applied to one point corresponding to the home button 412, on the region 300*a* that corresponds to the edge 410 to which the buttons are provided, the controller 180 outputs a recently displayed application list 422 to the display unit 151. Thereafter, when the drag gesture that is applied along the edge is applied to the region 300*a*, one icon is selected from among multiple icons that are shown on the list 422. An application icon 422*a*, when selected, is enlarged to be output as illustrated in FIG. 6B(b). When a predetermined-type gesture (for example, the short press gesture) is applied to the region 300*a*, an application is executed that corresponds to the enlarges application icon 422*a*. On the other hand, if a function that is assigned to the home button 412 is performed with the gesture applied to the region 300*a* outside of the main body, the controller 180 assigns a graphical effect to the home button 412.

On the other hand, as illustrated in FIG. 6C(a), when the short press gesture (or the double tap gesture) is applied to one point corresponding to the menu button 412, on the region 300*a* that corresponds to the edge 410 to which the buttons are provided, the controller 180 outputs the multiple menus items to the display unit 151. Thereafter, as illustrated in FIG. 6C(b), the controller 180 outputs the indicator 500 to one item among the multiple menu items in an overlapping manner. The indicator 500 is moved or selected based on the gesture that is applied to the region 300 outside of the main body. On the other hand, as illustrated in FIG. 6C(c), the controller 180 may not output the indicator to a menu screen. At this point, based on the application of the short press gesture to one point in conjunction with the menu item on the region 300 outside of the main body, the controller 180 selects a menu item 423*a* in conjunction with the one point. One point in conjunction with the menu item, as illustrated in FIG. 6C(c), is an point lying in the horizontal direction of the menu item on the region 300 outside of the main body.

That is, according to the present invention, a specific graphic object (for example, the icon or the menu item) is in conjunction with one point on the region 300 outside of the main body. Specifically, when a predetermined-type gesture is applied to the one point, the controller 180 selects (executes) the specific graphic object in conjunction with the one point.

As another example, the controller 180 selects (executes) a specific graphic object, based on the fact that at least two predetermined gestures are applied to a region corresponding to one edge and a region corresponding to a different edge perpendicular to the one edge on the region 300 outside of the main body, respectively. Specifically, according to the present invention, there occurs a point at which a first reference line that extends vertically from the gesture applied to the region corresponding to one edge to the one edge intersects a second reference lint that extends vertically from the gesture applied to the region corresponding to a different edge to the different edge. At this point, the controller 180 selects (executes) the intersection point that is formed by the gestures, based on the at least two gestures. When a predetermined-type gesture is applied to the regions that correspond to the one region and the different region, respectively, the controller 180 outputs to the display unit 151 a guide line that guides the first and second reference lines.

On the other hand, as illustrated in FIG. 7A(a), the controller 180 switches the home screen page 400 to a different home screen, based on the drag gesture that is applied along the one edge within the region 300a that corresponds to one edge, among the region 300 outside of the main body.

On the other hand, as illustrated in FIG. 7A(b), the controller 180 outputs at least one portion of a curtain window 460, when the drag gesture is applied within the region 300b that corresponds to a different edge perpendicular to the one edge, which is included in the region 300 outside of the main body. It is desirable that he drag gesture for outputting the curtain window be a drag gesture that extends from one point that corresponds to a state display line 450. On the other hand, as illustrated in FIG. 7A(c), the controller 180 makes the curtain window 460 appear, when the drag gesture is applied to the region 300b to which the drag gesture for outputting the curtain window is applied, in a direction opposite to the drag gesture for outputting the curtain window.

Figure 7B:
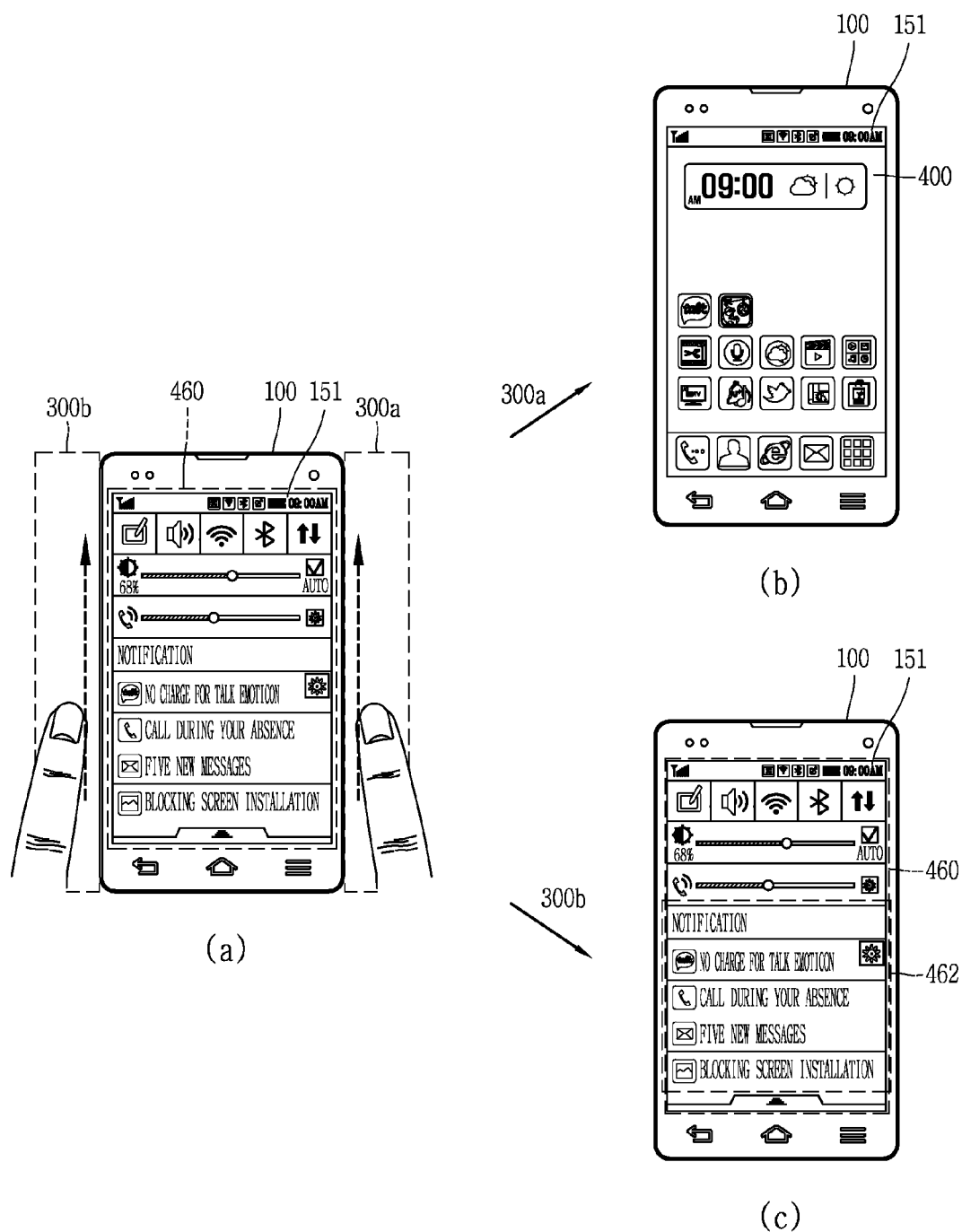

On the other hand, the controller 180 performs a function that differs according to the region to which the drag gesture is applied. When the drag gesture, as illustrated in FIG. 7B(a), is applied in the upward direction to the region 300a for outputting the curtain window 460, the controller 180, as illustrated in FIG. 7B(b), makes the curtain window 460 disappear. On the other hand, when the drag gesture is applied in the upward direction to the region 300b that lies in the direction opposite to the region 300a for outputting the curtain window 460, the controller 180, as illustrated in FIG. 7B(c), performs the function of scrolling a frame 462 included in the curtain window 460.

On the other hand, when based on the gesture that is applied to the region 300 outside of the main body, the controller 180, the curtain window 460 is output to the display unit 151, the controller 180 outputs the indicator 500 to one object among graphic objects 464 included in the curtain window 460. In addition, the controller 180 outputs the indicator 500 using the method that is described referring to FIG. 4B(a). The controller 180 changes the graphic object 464 that the indicator 500 overlaps, based on the gesture (for example, the drag gesture that is applied along one edge) that is applied to the region 300 outside of the main body. In addition, with the same gesture, the controller 180 performs a function that differs according to a position at which the indicator 500 overlap.

Figure 7C:
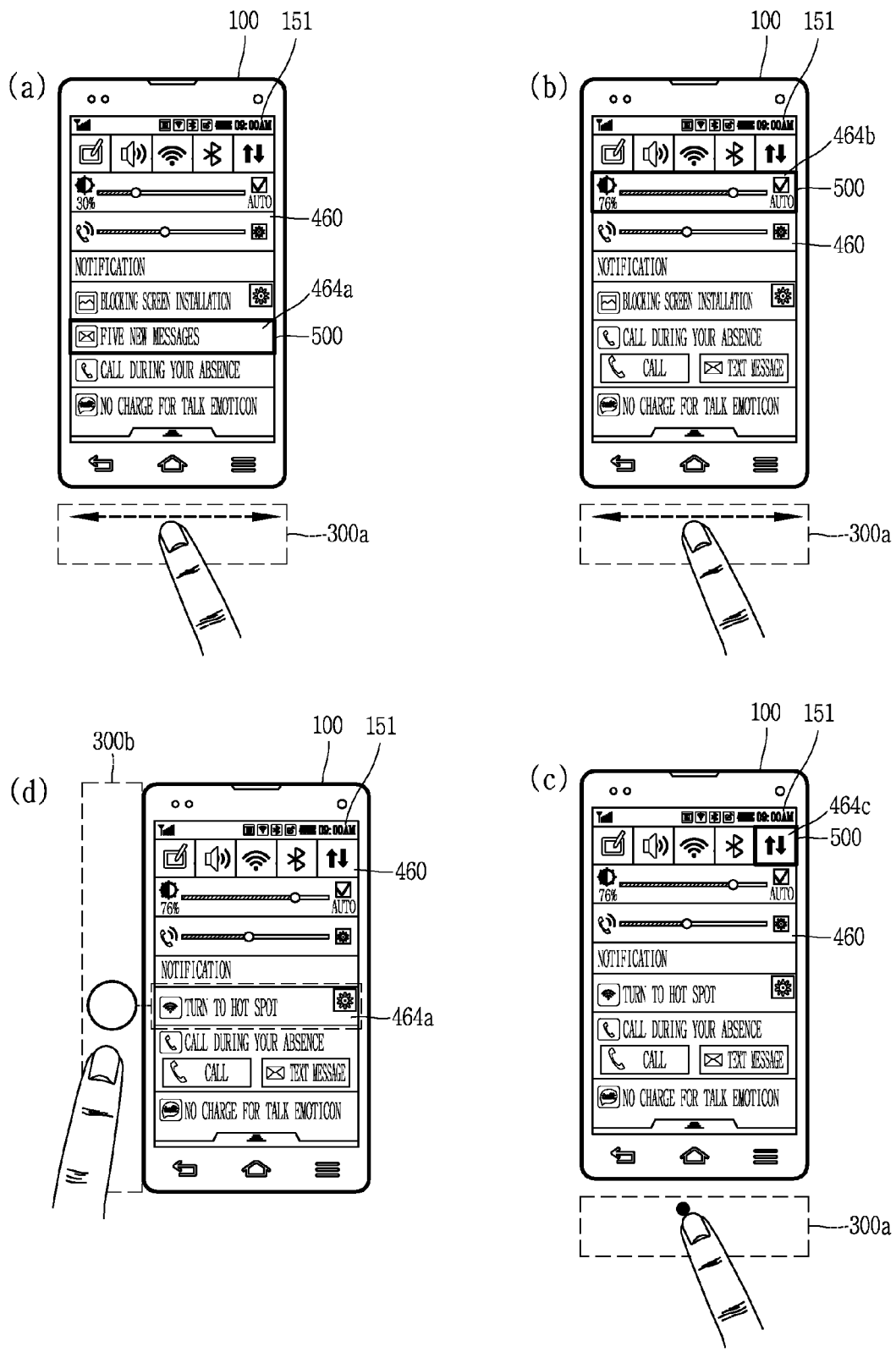

For example, as illustrated in FIG. 7C(a), if the indicator 500 overlaps a graphic object 464a that corresponds to alerting information (a push message), among the graphic objects that are output to the curtain window 460, the controller 180 deletes the graphic object 464a from the curtain window 460, based on the drag gesture that is applied to the region 300a outside of the main body.

On the other hand, as illustrated in FIG. 7C(b), if the indicator 500 overlaps a graphic object 464b through which the brightness control function and the sound volume control function are performed, among the graphic objects that are output to the curtain window 460, the controller 180 controls any one among the brightness and the sound volume, based on the same drag gesture that is applied to the region 300a outside of the main body.

On the other hand, as illustrated in FIG. 7C(c), if the indicator 500 overlaps a graphic object 464c associated with control of the mobile terminal, which is included in the curtain window 460, the controller 180 activates or inactivates a function that corresponds to the graphic object 464c, based on the short press gesture that is applied to the region 300a outside of the main body. At this point, when the long press gesture is applied to the region 300a outside of the main body, the controller 180 enters a particular setting mode (not illustrated) in which a function corresponding to the graphic object 464c can be set.

On the other hand, as illustrated in FIG. 7C(d), if the indicator 500 is not output to the curtain window 460, the controller 180, as described referring to FIG. 6C(c), executes a function in conjunction with the alerting information 464a, based on the gesture (for example, the short press gesture) that is applied to one point that lies in the horizontal direction of the alerting information 464a, on the region 300 outside of the main body.

As described above, according to the present invention, a function associated with at least one portion of the screen information is performed using the gesture that is applied to the region outside of the main body. Thus, the user is provided with a new type user interface.

Figure 8:
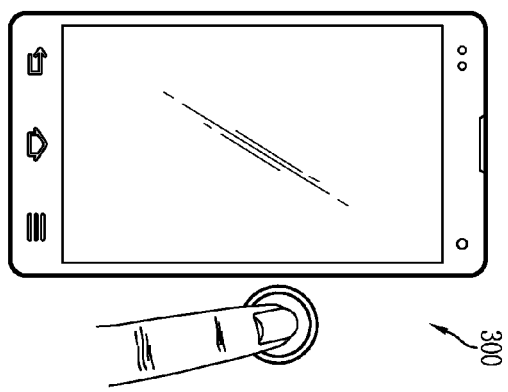
FIG. 8 is diagram for describing a method of controlling a display unit based on the gesture that is applied to the region outside of the main body, according to one embodiment of the present invention.
Figure 8:
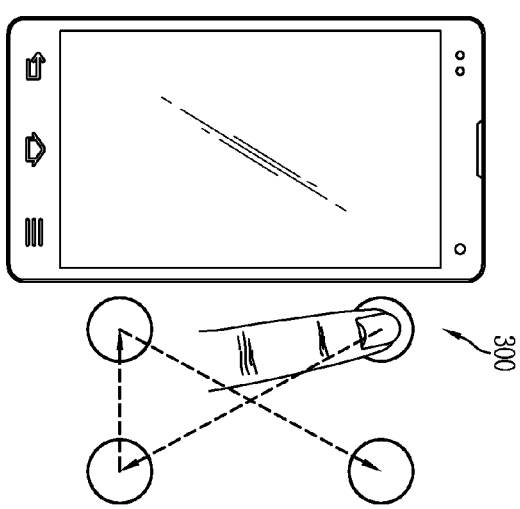
Figure 8:
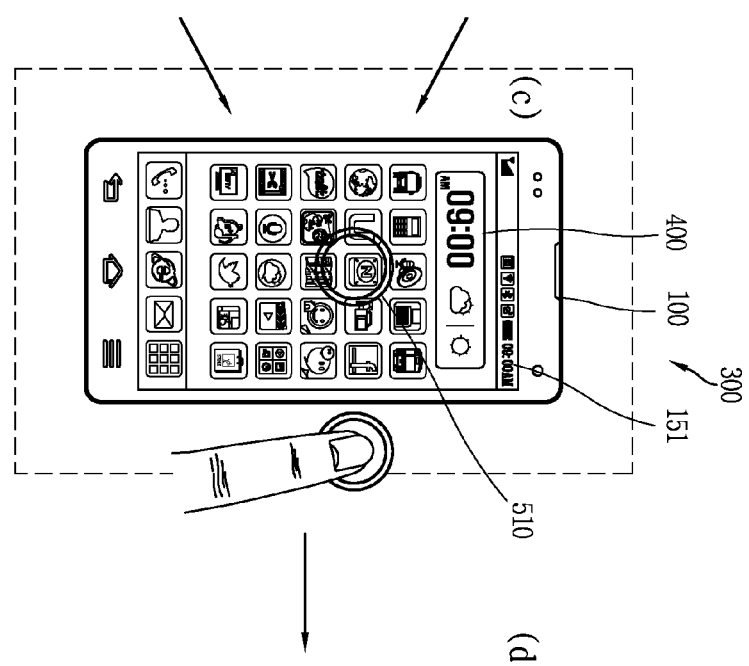
Figure 8:
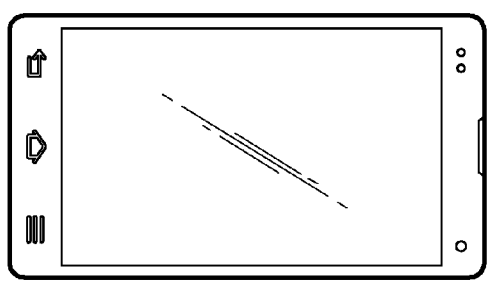

Referring to the accompanying drawings, a method is described in more detail below in which the display unit is activated or inactivated based on the gesture that is applied to the region outside the main body. FIG. 8 is diagrams for describing a method of controlling the display unit based on the gesture that is applied to the region outside of the main body, according to one embodiment of the present invention.

In the mobile terminal 100 according to the present invention, the display unit 151 is activated or inactivated based on the gesture that is applied to the region outside of the main body. A gesture for activating the display unit 151 corresponds to a tap gesture (for example, the double short (or double tap) press gesture) that is applied consecutively at least two or more times (or multiple times) within a reference time, or corresponds to a tap gesture in a predetermined pattern that is applied at least two or more times within a predetermined time.

For example, the controller 180 activates the display unit 151 that is in an inactivated state, when as illustrated in FIG. 8A, the tap gesture is applied consecutively at least two or more times within the reference time to the region 300 outside of the main body, or when the tap gesture in the predetermined pattern, as illustrated in FIG. 8B, is applied at least two or more times within the reference time to the region 300 outside of the main body.

Subsequently, the controller 180 inactivates the display unit 151, when in an activated state of the display unit 151, the tap gesture (for example, the double short (or double tap) press gesture) is applied consecutively at least two or more times within the reference time to the region 300 outside of the main body.

For example, the controller 180, as illustrated in FIG. 8D, switches the display unit 151 from the activated state to the inactivated state, when in the activated state of the display unit 151, the tap gesture is applied consecutively at least two or more times within the reference time to the region 300 outside of the main body as illustrated in FIG. 8C. At this point, as illustrated in FIG. 8C, when the tap gesture is applied consecutively at least two or more times with the reference time to the region 300 outside of the main body, the controller 180 outputs to one region of the display unit 151 a graphic object 510 alerting the user that the tap gesture is applied within the region outside of the main body.

On the other hand, in the mobile terminal 100 according to one embodiment of the invention, the activated display unit 151 is switched to the inactivated state based on the tap gesture that is applied at least two or more times to the display unit 151 in a contact touch manner. However, if the tap gesture is applied to the display unit 151 in the contact touch manner, a graphic object (for example, an icon or a widget) is output to a point to which the tap gesture is applied. In this case, based on the tap gesture, the controller 180 executes a function in conjunction with the graphic object. Thus, there occurs a problem that the display unit 151 is not switched to the inactivated state.

According to the present invention, as illustrated in FIG. 8C, the display unit 151 is inactivated only when the tap gesture is applied consecutively at least two or more times to the region 300 outside of the main body regardless of where the graphic object (for example, the icon or widget) is positioned on the screen information that is output to the display unit 151. In some cases, due to the graphic object that is output to the display unit 151, there is no space (region) to which the tap gesture is applied at least two or more times in order to inactivate the display unit 151. In this case, the controller 180 switches the display unit 151 from the activated state to the inactivated state, based on the tap gesture that is applied at least two or more times to the region 300 outside of the main body.

According to the present invention, with the configuration described above, the problem is solved that the tap gesture cannot be applied at least two or more times due to the graphic object included in the screen information that is output to the display unit 151.

Figure 9A:
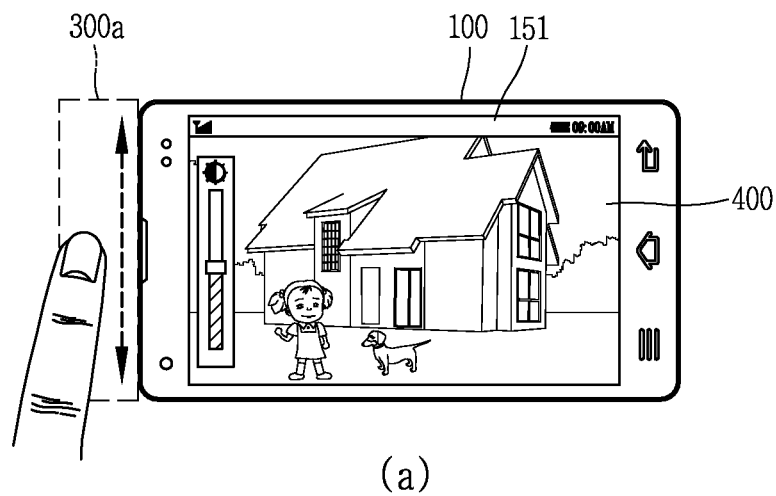
FIGS. 9A, 9B and 9C are diagrams for describing a method according to one embodiment of the present invention, in which a function associated with a moving image is controlled based on the gesture that is applied to the region outside of the main body in a state where the moving image is reproduced on the display unit.
Figure 9A:
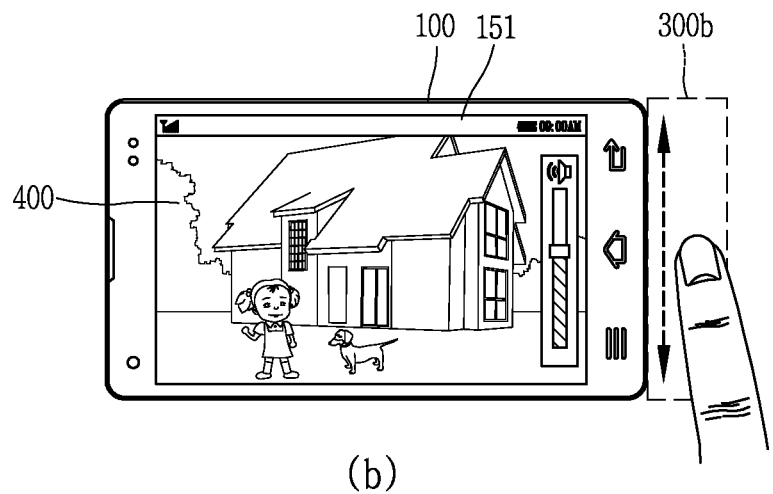
Figure 9B:
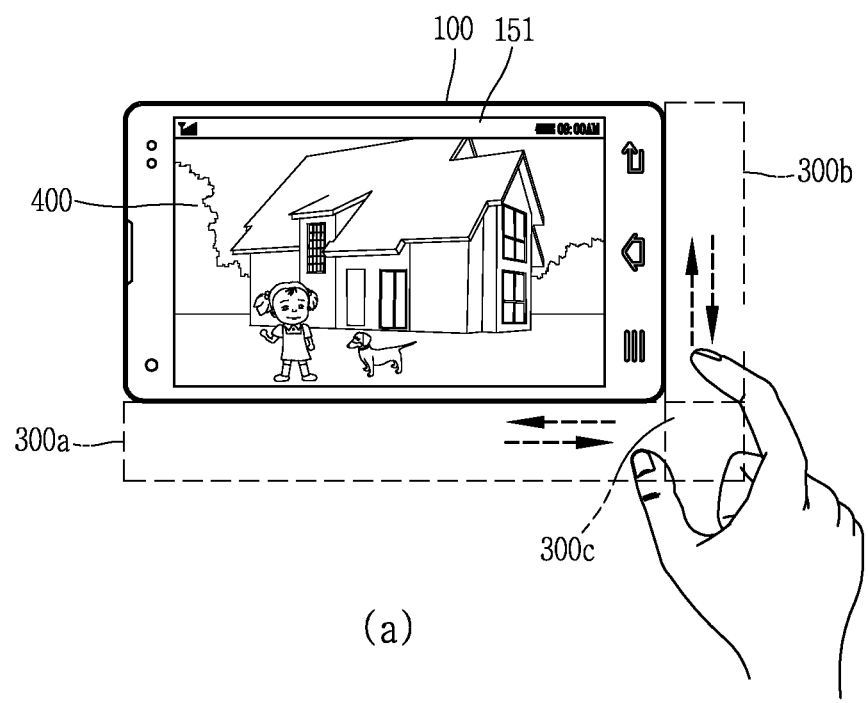
Figure 9B:
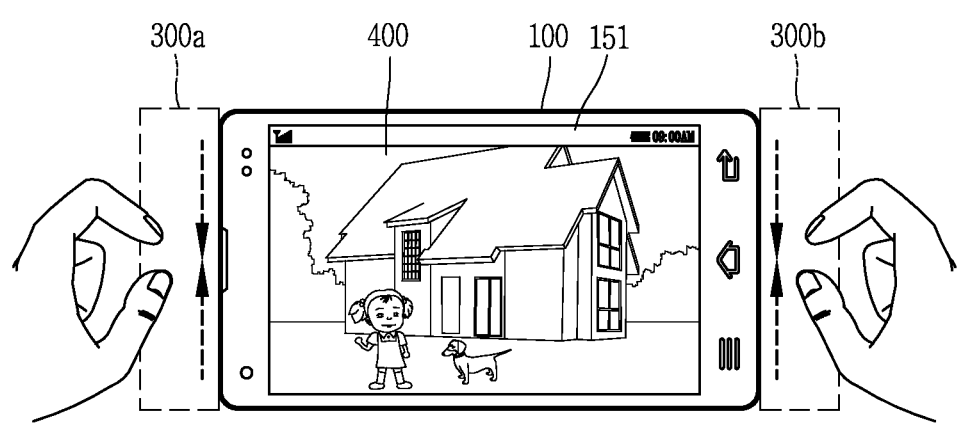
Figure 9C:
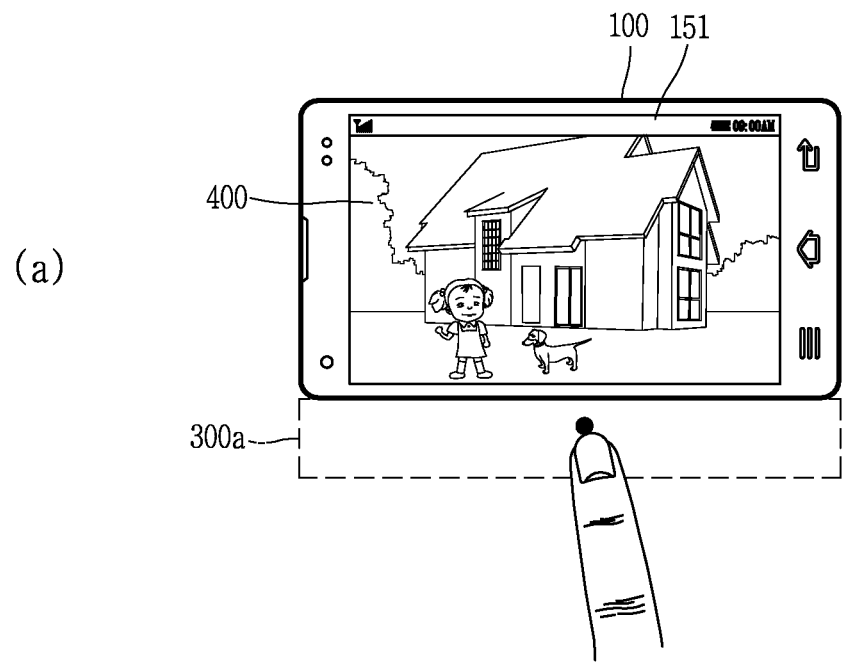
Figure 9C:
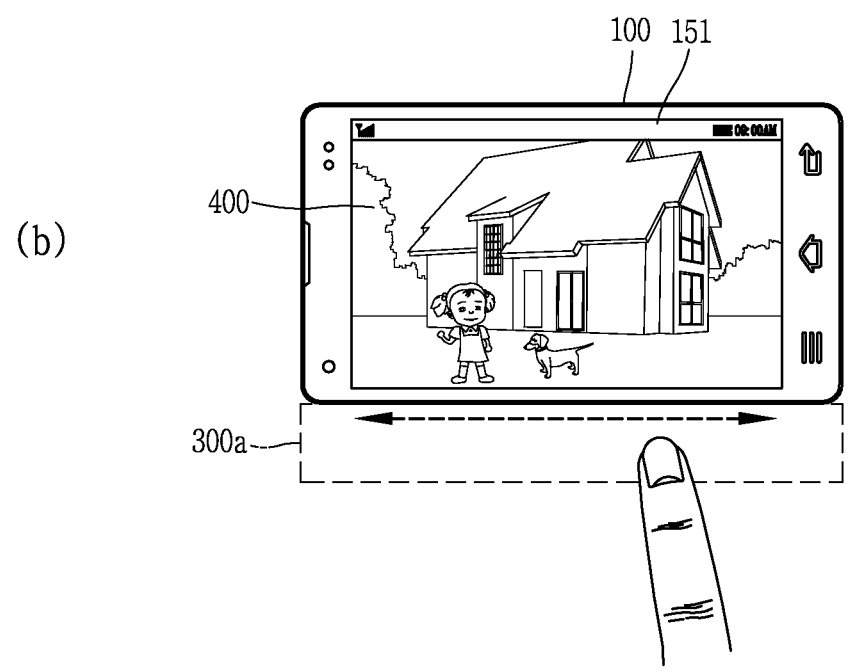

Referring to the accompanying drawings, a method is described in more detail below in which a function that is being executed on the mobile terminal is controlled based on the gesture that is applied to the region outside of the main body. FIGS. 9A, 9B and 9C are diagrams for describing a method according to one embodiment of the present invention, in which a specific function is provided based on the gesture that is applied to the region outside of the main body in a state where a moving image is reproduced on the display unit.

First, as illustrated in FIG. 9A(a), the controller 180 performs the brightness control function when in the state where a moving image 400 is reproduced on the display unit 151, the drag gesture is applied to the region 300*a* that corresponds to one edge, within the region 300 outside of the main body. In addition, as illustrated in FIG. 9A(b), the controller 180 performs the sound volume control function, based on the application of the drag gesture to the region 300*b* that lies in the direction opposite to the region that corresponds to the one edge.

On the other hand, as illustrated in FIG. 9B(a), the controller 180 reduces or enlarges the moving image 400 that is being reproduced, based on the application of the pinch-in gesture or the pinch-out gesture to the region 300*c*, one region among the regions that correspond to the multiple corners, respectively. In addition, as illustrated in FIG. 9B(b), the controller 180 captures the screen information 400 that is output to the display unit 151 when at least two pinch-in gestures are applied to at least two regions, respectively, among the multiple regions that are included in the region 300 outside of the main body.

On the other hand, as illustrated in FIG. 9C(a), the controller 180 stops the moving image 400 that is being reproduced or reproduces the stopped moving image 400 when a predetermined-type gesture (for example, the short press gesture) is applied to one point on the region 300 outside of the main body. In addition, as illustrated in FIG. 9C(b), the controller 180 performs one function among the moving image fast forward (FF) function and the moving image rewinding (Rew) function, based on the drag gesture that is applied to the region 300*a* corresponding to one edge, among the multiple regions. At this point, the moving image fast forward (FF) function and the moving image rewinding (Rew) function, as described referring to FIGS. 3A and 3B, and 4E(a) and 4E(b), are controlled in such a manner that a fast forward speed and a rewinding speed each differ according to the distance from the main body to a position at which the drag gesture is applied.

Figure 10A:
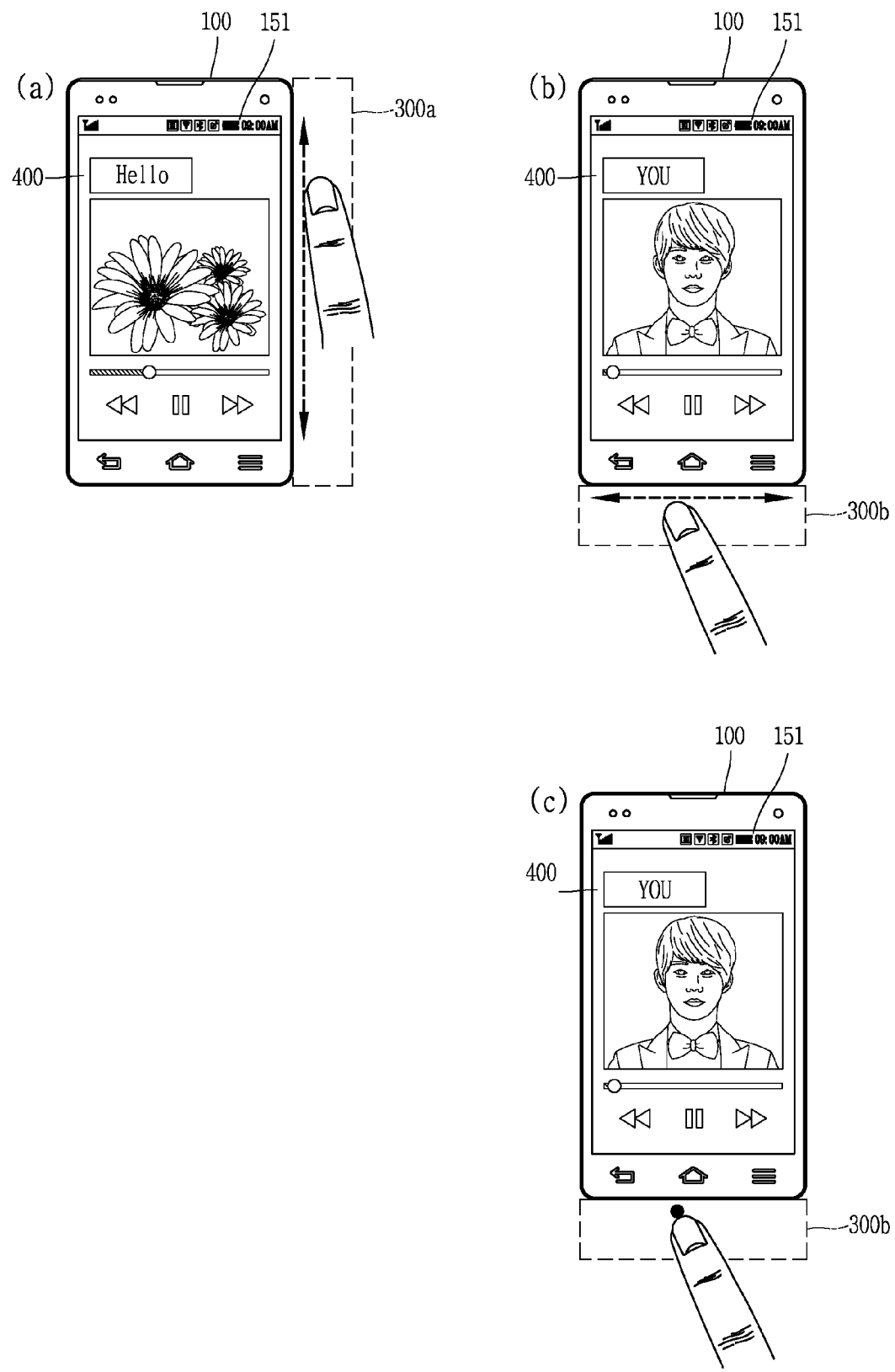
FIGS. 10A, 10B and 10C are diagrams for describing a method according to one embodiment of the present invention, in which in a state where music is being reproduced, a function associated with the music is controlled based on the gesture that is applied to the region outside of the main body.
Figure 10B:
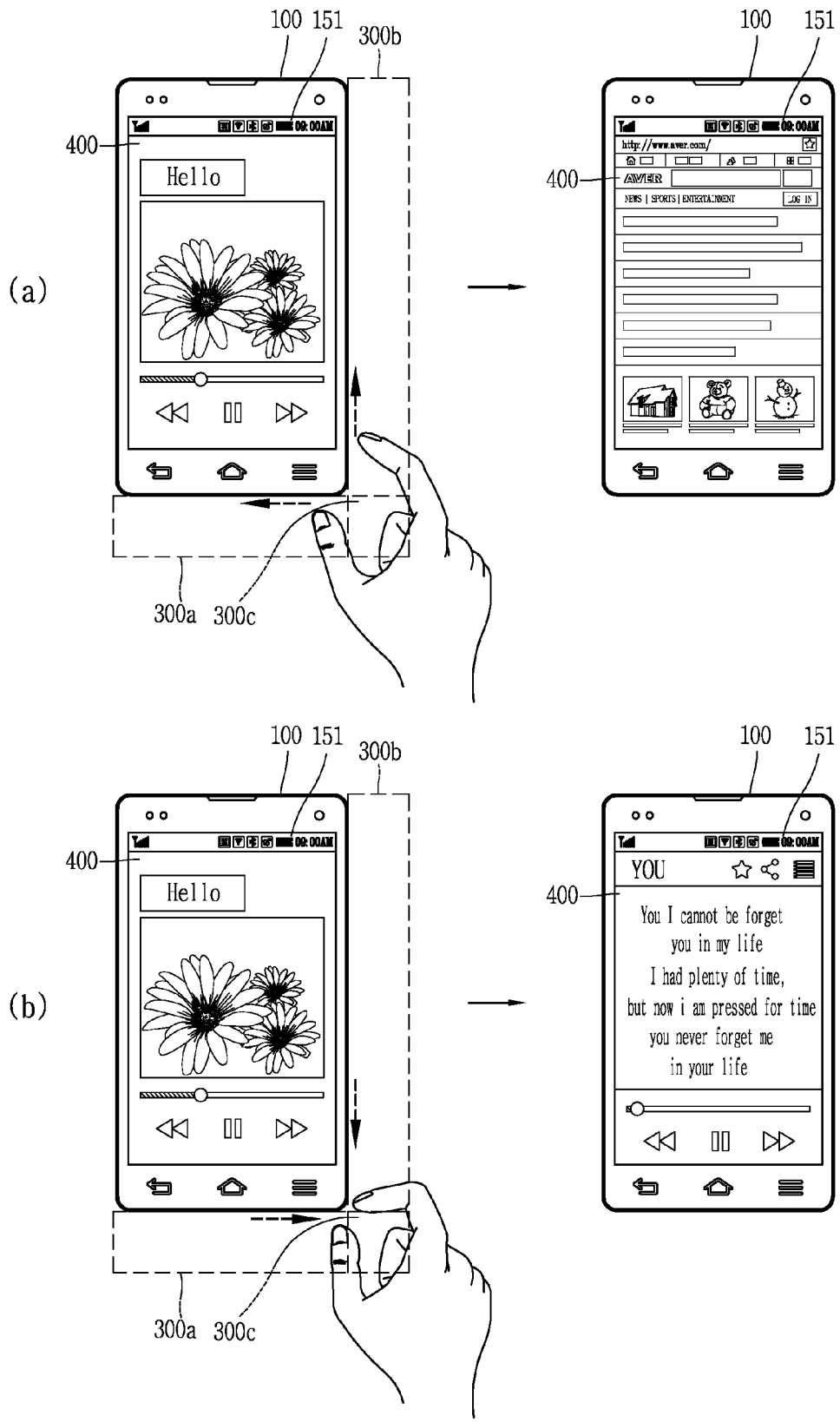
Figure 10C:
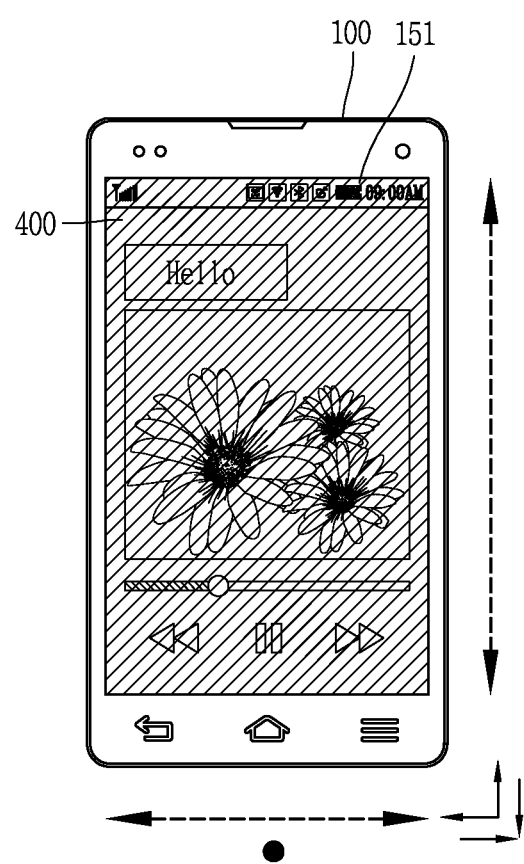

FIGS. 10A, 10B and 10C are diagrams for describing a method according to one embodiment of the present invention, in which in a state where music is being reproduced, a function associated with the music is controlled based on the gesture that is applied to the region outside of the main body.

First, as illustrated in FIG. 10A(a), the controller 180 performs the sound volume control function when in the state where music 400 is reproduced on the display unit 151, the drag gesture is applied to the region 300*a* that corresponds to one edge, within the region 300 outside of the main body. In addition, as illustrate din FIG. 10A(b), the controller 180 performs at least one function among the musing fast forward function, the musing rewinding function, the previous music reproducing function, and the next music reproducing function, based on the application of the drag gesture to the region 300*b* corresponding to a different edge perpendicular to the one edge. As illustrated in FIGS. 3(*a*). 3(*b*), and 9C(b). the controller 180 performs control in such a manner that the fast forward speed or the rewinding speed differs according to the distance from the main body to the distance at which the drag gesture is applied.

In addition, the controller 180 stops the music that is being reproduced or reproduces the stopped music, based on a predetermined-type gesture (for example, the long press gesture) that is applied to one point 300*a* on the region 300 outside of the main body.

On the other hand, the controller 180 performs a function associated with the music that differs according to the pinch-in gesture or the pinch-out gesture that is applied to the region 300*c*, one region that corresponds to the corner, among the multiple corners that are included in the region 300 outside of the main body.

For example, as illustrated in FIG. 10B(a), the controller 180 outputs to the display unit 151 the web page 400 for searching for information relating to the music that is being reproduced, when the pinch-out gesture is applied to the region 300*c*, one region that corresponds to the corner. On the other hand, as illustrated in FIG. 10B(b), the controller 180 outputs to the display unit 151 at least one portion of song word information relating to the music that is being reproduced, when the pinch-in gesture is applied to the region 300*c*, one region that corresponds to the corner.

On the other hand, if the music is being reproduced on the mobile terminal, even though the display unit 151 is in the inactivated, the controller 180 controls a function associated with the music, based on the gesture that is applied to the region 300 outside of the main body. Specifically, as illustrated in FIG. 10C, in a state where the music is reproduced on the mobile terminal and at the same time, the display unit 151 is in the inactivated state, when a predetermined-type gesture is applied to the region 300 outside of the main body, the controller 180 performs the function associated with the music and maintains the inactivated state of the display unit 151.

As another example, in addition to maintaining the display unit 151 in the inactivated state, the controller 180 switches the display unit 151 to the activated state or switches the display unit 151 to the activated state for a predetermined time, and then when the predetermined time elapses, switches the display unit 151 back to the inactivated state.

Figure 11A:
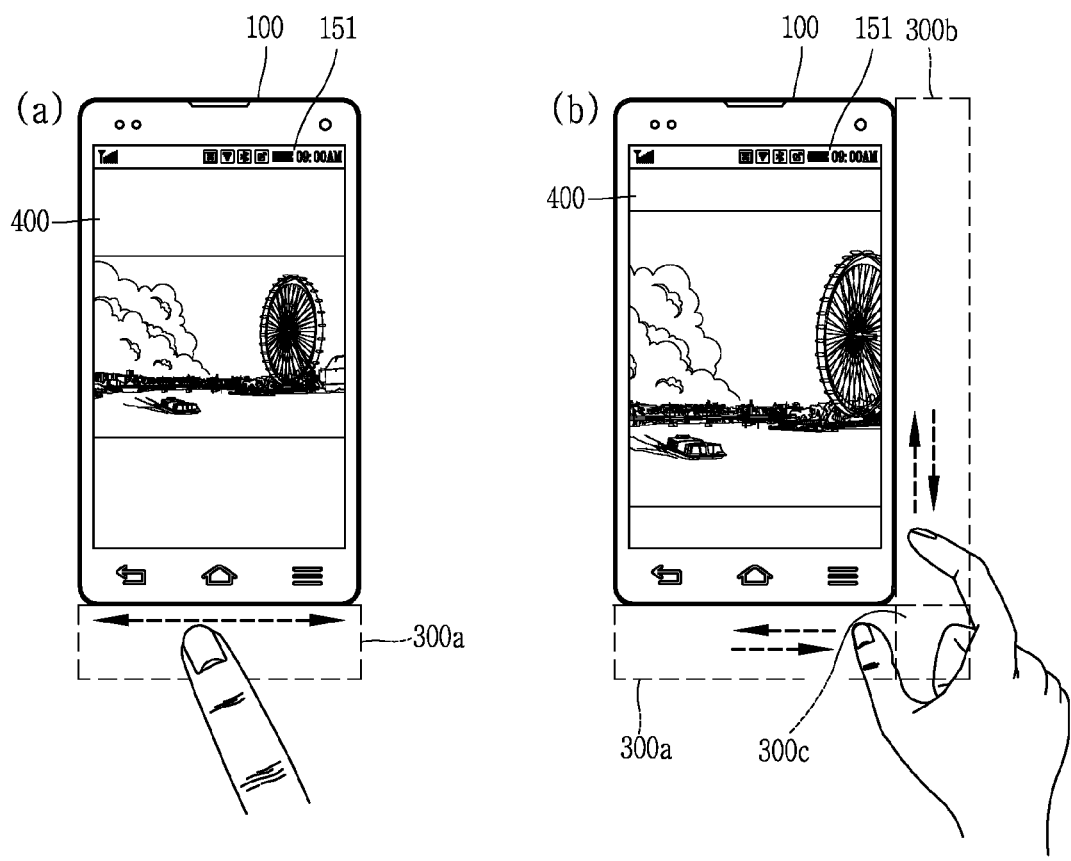
FIGS. 11A and 11B are diagrams for describing a method of providing a specific function based on the gesture that is applied to the region outside of the main body in a gallery mode.
Figure 11A:
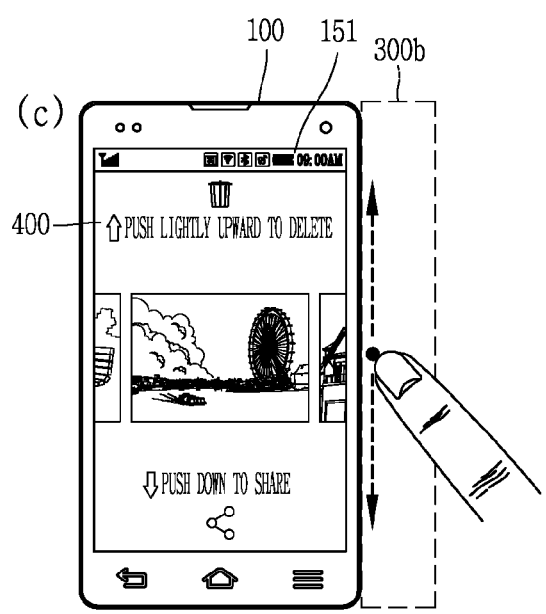
Figure 11B:
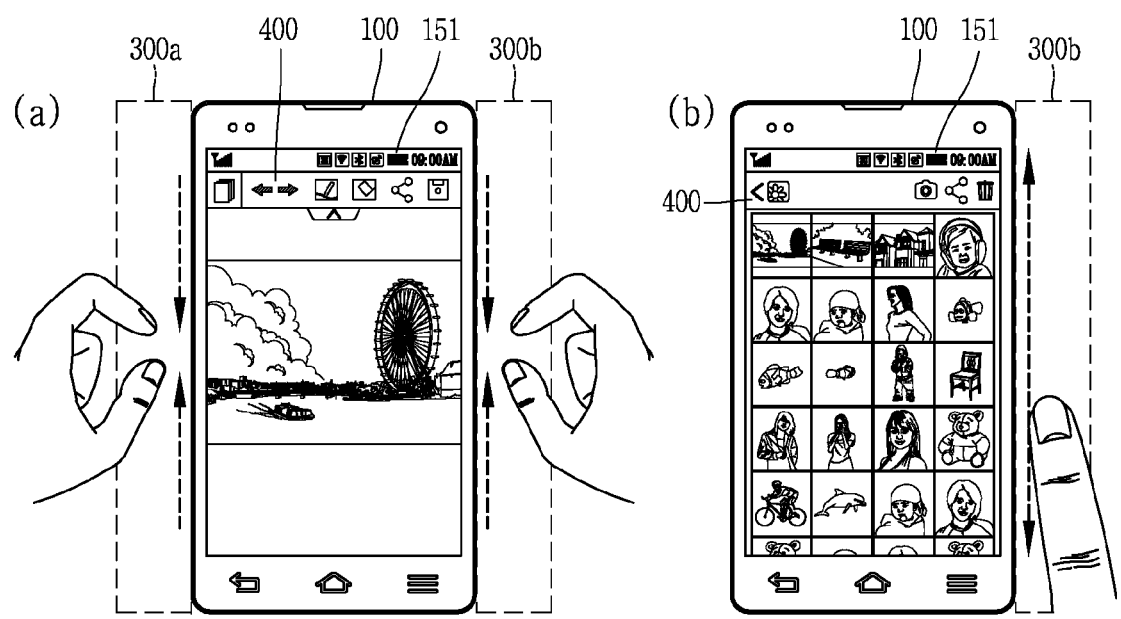

FIGS. 11A and 11B are diagrams for describing a method of providing a specific function based on the gesture that is applied to the region outside of the main body in a gallery mode.

The gallery mode means a mode in which the screen information (an image, a photograph, a moving image or the like) that is stored in the memory unit 170 of the mobile terminal 100 is checked.

As illustrated in FIG. 11A(a), in the gallery mode, the controller 180, outputs to the display unit 151 at least one piece of information 400 that is stored in the memory 170. Thereafter, based on the drag gesture that is applied to the region 300a that corresponds to one edge, within the region 300 outside of the main body, the controller 180 switches to different screen information the screen information 400 that is output to the display unit 151.

On the other hand, as illustrated in FIG. 11A(b), the controller 180 reduces or enlarges the screen information 400 that is output to the display unit 151, based on the pinch-in gesture or the pinch-out gesture that is applied to the region 300c, one region among the regions that correspond to the multiple corners, respectively.

As illustrated in FIG. 11A(c), the controller 180 enters the editing mode in which the function associated with the screen information 400 included in the gallery is performed, when a predetermined-type gesture (for example, the long press gesture) is applied to one point on the region 300 outside of the main body. The functions associated with the screen information 400 include a deletion function of deleting the screen information 400, a sharing function (for example, a social network function (a social network service (SNS)) of sharing the screen information 400, and the like. In a state where the mobile terminal is in the editing mode, when the drag gesture is applied to the region 300a, one region within the region 300 outside of the main body, the controller 180 performs at least one function among the deletion function of deleting the selected screen information and the sharing function.

On the other hand, in a state where one piece of screen information is output to the display unit 151 in the gallery mode, the pinch-in gesture is applied within at least two regions 300a and 300b among the multiple regions that are included in the region 300 outside of the main body. In this case, the controller 180 enters the editing mode in which the screen information that is output to the display unit 151 can be edited, without capturing the screen information 400. In addition, if in the gallery mode, multiple thumbnails for the pieces of screen information that are stored in the memory unit 170 are output to the display unit 151, the controller 180 performs the scroll function, based on the drag gesture that is applied to the region that corresponds to one edge, within the region outside of the main body.

Figure 12:
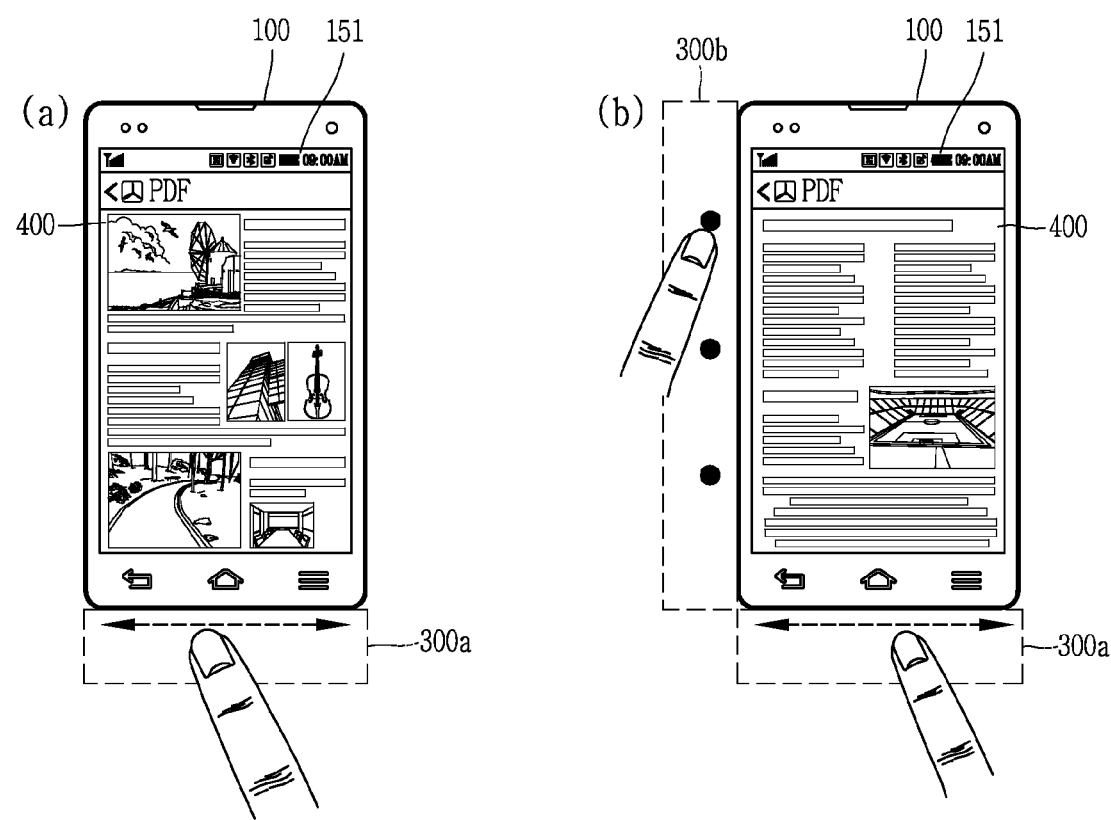
FIGS. 12A and 12B are diagrams for describing a method in which a function is performed that differs according to a position in which the gesture is applied within a specific region that is included in the region outside of the main body.

Referring to the accompanying drawings, a method is described in more detail below in which a function is performed that differs according to the position at which the gesture is applied within a specific region that is included in the region outside of the main body. FIGS. 12A and 12B are diagrams for describing the method in which the function is performed that differs according to the position at which the gesture is applied within a specific region that is included in the region outside of the main body.

First, as illustrated in FIG. 12A, the controller 180 switches to a different page a page corresponding to the screen information 400 that is output to the display unit 151, when the drag gesture is applied to the region 300a that corresponds to one edge, within the region outside of the main body.

In addition, the controller 180 performs control in such a manner that the number of switched pages differ, when a predetermined-type gesture (for example, the long press gesture) is applied to the region 300b that corresponds to a different edge perpendicular to the one edge and the drag gesture is applied to the region 300a that corresponds to the one edge. In addition, as illustrated in FIG. 12B, the controller 180 performs control in such a manner that the number of switched pages differs according to the position at which the gesture is applied within the region 300b that corresponds to the different edge.

As described above, according to the present invention, a specific function or a general operation by the mobile terminal is controlled in response to the gesture that is applied to the region outside of the main body of the mobile terminal.

Therefore, the user can apply a control command to the mobile terminal without covering the display unit. Accordingly, the user can efficiently use information that is output to the display unit.

In addition, according to the present invention, a function associated with the screen information is performed in response to the gesture that is applied to the region outside of the main body of the mobile terminal. Therefore, the user can solve the problem that the space (region) of the display unit to which the touch is applied is limited due to limitation to the size of the display unit.

In addition, according to the present invention, a function associated with the screen information is performed in response to the gesture that is applied to the region outside of the main body of the mobile terminal. Therefore, the user can prevent a malfunction that results from applying the touch to the display unit, by performing the function with the application of the gesture to the region outside of the main body.

In addition, according to the present invention, a specific function is performed based on the gesture that is applied to the region outside of the main body while maintaining the inactivated state of the display unit. Therefore, on the user side. a specific function is performed without omitting a step of activating the display unit and the like. Thus, convenience is improved, and on the mobile terminal side, power consumption necessary for activating the display unit is reduced.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal comprising:
a main body;
a display unit that is arranged to the main body and to which screen information is output;
a sensing unit that senses a gesture that is applied to a region outside of the main body; and
a controller that performs a function associated with at least one portion of the screen information that is output to the display unit if a predetermined-type gesture is applied to the region outside of the main body,
wherein the region outside of the main body includes multiple regions that correspond to multiple edges of the main body, respectively, wherein the associated function is determined based on the gestures that are applied to at least two regions among the multiple regions that correspond to the multiple edges, respectively, the gestures that are applied to the at least two regions are a first type gesture and a second type gesture different from the first type gesture, respectively,
wherein when the first type gesture is applied to a first region, one region among the multiple regions, and then the second type gesture is applied to a second region that lies in the direction opposite to the first region, the controller performs a sound volume control function, and
wherein when the first type gesture is applied to the second region and then the second type gesture is applied to the first region, the controller performs a brightness control function.

2. The mobile terminal of claim 1, wherein the controller performs a function that differs based on a drag gesture that is applied along different edges within the multiple regions that correspond to the multiple edges, respectively.

3. The mobile terminal of claim 2, wherein if the drag gesture is applied along one edge of the main body, the controller performs a function of scrolling a page that corresponds to the screen information, and
wherein if the drag gesture is applied along a different edge perpendicular to the one edge, the controller switches a page corresponding to the screen information to a different page.

4. The mobile terminal of claim 1, wherein when the predetermined-type gesture is applied to one point on the region outside of the main body, the controller outputs an indicator to the display unit,
wherein the indicator is moved with application of a moving type gesture to the region outside of the main body, and
wherein a point at which the indicator is positioned is selected in response to application of a selection type gesture different from the moving type gesture to the region outside of the main body.

5. The mobile terminal of claim 1, wherein when drag gestures that are applied to one region and the other region among the at least two regions, respectively, are a pinch-in gesture or a pinch-out gesture, the controller reduces or enlarges a page corresponding to the screen information.

6. The mobile terminal of claim 5, wherein if at least two of the pinch-in gestures are applied to the at least two regions, respectively, the controller captures the screen information that is output to the display unit.

7. The mobile terminal of claim 1, wherein the controller performs a function that differs according to a position at which the first type gesture is applied within the multiple regions.

8. The mobile terminal of claim 1, wherein the multiple regions include at least one among regions that correspond to corners, respectively, at which the multiple edges intersect, and
wherein when one type gesture is applied to any one among the regions that correspond to the corners, respectively, and another type gesture is applied to any one among the regions that correspond to the edges of the main body, respectively, the controller executes a predetermined application.

9. The mobile terminal of claim 8, wherein the another type gesture is a drag gesture that is applied along the edge of the main body, and
wherein the controller executes an application that differs according to a direction in which the drag gesture is applied.

10. The mobile terminal of claim 1, wherein the function that is performed based on the gesture that is applied to the region outside of the main body is determined based on an operation mode for the mobile terminal.

11. The mobile terminal of claim 10, wherein when the mobile terminal is in a first operation mode, the controller performs a first function based on the gesture that is applied to the region outside of the main body, and
wherein when the mobile terminal is in a second operation mode different from the first operation mode, the controller performs a second function different from the first function, based on the gesture.

12. The mobile terminal of claim 1, wherein if a scroll function is performed with a drag gesture that is applied to the region outside of the main body, the controller performs control in such a manner that a scroll speed differs according to a distance from the main body to a position at which the drag gesture is applied.

13. The mobile terminal of claim 1, wherein when the display unit is inactivated, and the predetermined-type gesture is applied to the region outside of the main body, the controller performs the associated function and maintains the inactivated state of the display unit.

14. A method of controlling a mobile terminal, the method comprising:
outputting screen information;
sensing a gesture that is applied to a region outside of a main body of the mobile terminal;
performing a function associated with at least one portion of the screen information that is output to a display unit on the main body if a predetermined-type gesture is applied to the region outside of the main body, wherein the region outside of the main body includes multiple regions that correspond to multiple edges of the main body, respectively, wherein the associated function is determined based on the gestures that are applied to at least two regions among the multiple regions that correspond to the multiple edges, respectively, the gestures that are applied to the at least two regions are a first type gesture and a second type gesture different from the first type gesture, respectively;

when the first type gesture is applied to a first region, one region among the multiple regions, and then the second type gesture is applied to a second region that lies in the direction opposite to the first region, performing a sound volume control function; and when the first type gesture is applied to the second region and then the second type gesture is applied to the first region, performing a brightness control function.

15. The method of claim 14, wherein the performing of the associated function includes performing a function that differs based on a drag gesture that is applied along different edges within the multiple regions that correspond to the multiple edges, respectively.

16. The method of claim 15, wherein the performing of the associated function includes performing a function of scrolling a page that corresponds to the screen information if the drag gesture is applied along one edge of the main body and switching a page corresponding to the screen information to a different page if the drag gesture is applied along a different edge perpendicular to the one edge.

17. The method of claim 14, wherein the performing of the associated function includes outputting an indicator to the display unit, wherein the indicator is moved with application of a moving type gesture to the region outside of the main body when the predetermined-type gesture is applied to one point on the region outside of the main body, and wherein a point at which the indicator is positioned is selected in response to application of a selection type gesture different from the moving type gesture to the region outside of the main body.

* * * * *